US012671355B2

(12) United States Patent
Yajurvedi et al.

(10) Patent No.:     US 12,671,355 B2
(45) Date of Patent:        Jun. 30, 2026

(54) FIELD-ORIENTED SENSORLESS BRUSHLESS MOTOR CONTROL IN A POWER TOOL

(71) Applicant: Black & Decker Inc., New Britain, CT (US)

(72) Inventors: Girish Yajurvedi, Towson, MD (US); Mehdi Ramezani, Cockeysville, MD (US); Michael K. Forster, White Hall, MD (US); John C. Vanko, Timonium, MD (US); Tal Gottesman, Lutherville, MD (US); Levent Gokdere, Houston, TX (US)

(73) Assignee: Black & Decker Inc., New Britain, CT (US)

( * ) Notice: Subject to any disclaimer, the term of this patent is extended or adjusted under 35 U.S.C. 154(b) by 102 days.

(21) Appl. No.: 17/731,997

(22) Filed: Apr. 28, 2022

(65) Prior Publication Data

US 2022/0255479 A1      Aug. 11, 2022

Related U.S. Application Data

(63) Continuation of application No. 16/896,504, filed on Jun. 9, 2020, now Pat. No. 11,469,697.
(Continued)

(51) Int. Cl.
  H02P 21/10          (2016.01)
  B25F 5/02          (2006.01)
  (Continued)
(52) U.S. Cl.
  CPC ................ H02P 21/10 (2013.01); B25F 5/02 (2013.01); H02P 21/0007 (2013.01);
  (Continued)

(58) Field of Classification Search
  CPC ............ H02J 7/00; H02J 7/0024; H02J 7/022; H01M 10/00; H01M 10/4207;
  (Continued)

(56) References Cited

U.S. PATENT DOCUMENTS

2012/0062160 A1    3/2012  Yang et al.
2012/0118662 A1*  5/2012  Sakai .................. H02M 7/5395
                                                          180/443
(Continued)

OTHER PUBLICATIONS

EP Communication 94(3) dated, May 10, 2022 in corresponding EP application No. 20178956.7.
(Continued)

*Primary Examiner* — Said Bouziane
(74) *Attorney, Agent, or Firm* — Brake Hughes Bellermann LLP

(57)          ABSTRACT

A power tool is provided including a housing, a brushless motor disposed within the housing, a power switch circuit that supplies power from a power source to the brushless motor, and a controller configured to apply a drive signal to the power switch circuit to control the supply of power to the brushless motor. The controller is configured to receive at least one signal associated with a phase current of the motor, detect an angular position of the rotor based on the phase current of the motor within a variable speed range of zero to at least 15,000 rotations-per-minute (RPM), and control the drive signal based on the detected angular position of the rotor to electronically commutate the motor within a power output of zero to at least 1500 watts.

12 Claims, 29 Drawing Sheets

Related U.S. Application Data

(60) Provisional application No. 62/859,410, filed on Jun. 10, 2019.

(51) Int. Cl.

| | |
|---|---|
| *H02P 21/00* | (2016.01) |
| *H02P 21/13* | (2006.01) |
| *H02P 21/18* | (2016.01) |
| *H02P 21/22* | (2016.01) |
| *H02P 21/34* | (2016.01) |
| *H02P 21/36* | (2016.01) |
| *H02P 27/12* | (2006.01) |

(52) U.S. Cl.
CPC .............. *H02P 21/13* (2013.01); *H02P 21/18* (2016.02); *H02P 21/22* (2016.02); *H02P 21/34* (2016.02); *H02P 21/36* (2016.02); *H02P 27/12* (2013.01); *H02P 2203/11* (2013.01)

(58) Field of Classification Search
CPC ......... H01M 10/4214; H01M 10/4221; H01M 10/441; H01M 10/0445; H01M 2/1022; H01M 2/1033; H01M 2220/30; H02P 25/14; H02P 29/00

See application file for complete search history.

(56) References Cited

U.S. PATENT DOCUMENTS

| | | | | |
|---|---|---|---|---|
| 2016/0020443 | A1* | 1/2016 | White | H02J 5/00 318/245 |
| 2020/0343841 | A1* | 10/2020 | Rotilli Filho | H02P 6/183 |
| 2021/0229255 | A1* | 7/2021 | Obermann | H02P 6/181 |

OTHER PUBLICATIONS

EP Communication pursuant to Article 94(3) EPC mailed May 21, 2024 in corresponding EP application No. 20178956.7, 7 pages.

\* cited by examiner

- Prior Art -

400

| Voltage Pulse | UH, VH, WH | UL, VL, WL | Angle (Degrees) |
|---|---|---|---|
| V1 | 1, 0, 0 | 0, 1, 1 | 0 |
| V2 | 1, 1, 0 | 0, 0, 1 | 60 |
| V3 | 0, 1, 0 | 1, 0, 1 | 120 |
| V4 | 0, 1, 1 | 1, 0, 0 | 180 |
| V5 | 0, 0, 1 | 1, 1, 0 | 240 |
| V6 | 1, 0, 1 | 0, 1, 0 | 300 |

FIG. 13

| Voltage Pulse | UH, VH, WH | UL, VL, WL | Angle (Degrees) |
|---|---|---|---|
| V1 | 1, 0, 0 | 0, 0, 1 | 30 |
| V2 | 0, 1, 0 | 0, 0, 1 | 90 |
| V3 | 0, 1, 0 | 1, 0, 0 | 150 |
| V4 | 0, 0, 1 | 1, 0, 0 | 210 |
| V5 | 0, 0, 1 | 0, 1, 0 | 270 |
| V6 | 1, 0, 0 | 0, 1, 0 | 330 |

FIG. 16

FIELD-ORIENTED SENSORLESS BRUSHLESS MOTOR CONTROL IN A POWER TOOL

RELATED APPLICATION

This utility application is a continuation of U.S. patent application Ser. No. 16/896,504, filed Jun. 9, 2020, which claims the benefit of U.S. Provisional Application No. 62/859,410, filed Jun. 10, 2019, both of which are incorporated herein by reference their entireties.

FIELD

This disclosure relates to sensorless control of an electronically commutated brushless motor in a power tool, and particularly to sensorless field-orientated control of a brushless motor in a power tool.

BACKGROUND

Power tools may be of different types depending on the type of output provided by the power tool. For example, a power tool may be a drill, hammer, grinder, impact wrench, circular saw, reciprocating saw, and so on. Some power tools may be powered by an alternating current (AC) power source while others may be portable and may be powered by a direct current (DC) power source such as a battery pack. Power tools may use AC or DC motors.

Some power tools have a movable switch such as a trigger or a speed dial that can be used to vary the speed of the motor or the power output by the tool. The switch can be moved from a resting position where the power output of the tool is minimum (e.g., zero), and a fully activated (e.g., pulled) position where the power output of the tool is maximum. Thus, the tool can output the maximum power only when the trigger is fully activated. Also, after the trigger is fully activated, the tool's power output cannot be increased beyond its maximum power. The present disclosure addresses these and other issues related to power tools as described below in the detail.

Use of Brushless Direct-Current (BLDC) motors in power tools has become common in recent years. A typical BLDC motor includes a stator including a series of windings that form three or more phases, and a rotor including a series of magnets that magnetically interact with the stator windings. As the phases of the windings are sequentially energized, they cause rotation of the rotor. BLDC motors generate more power and are more efficient that similarly-sized conventional brushes DC motors and universal motors. BLDC motors are electronically commutated, requiring a controller to commutate proper phases of the motor based on the angular position of the rotor. Conventionally, the motor is provided with a series of Hall sensors that detect a magnetic field of the rotor and provide signals to the controller indicative of the rotor position.

BLDC motors are typically driven using a trapezoidal control scheme—also referred to as six-step commutation control—where the motor is divided to phases of set degrees that are sequentially energized to cause rotation of the rotor. In one implementation, each phase of the motor is energized for a set angle (e.g., 120 degrees in a three-phase motor configuration). While trapezoidal control can be relatively efficient at high speed, it may cause torque ripple at low speeds as the commutation cycles between successive phases. Furthermore, in trapezoidal control, at least one phase of the motor is not energized at any given time, which limits the total power input provided to the motor. It would be advantageous to provide a motor control scheme that allows maximum power input to the motor with high level of efficiency at different speed ranges.

Known techniques for sensorless control of BLDC motors are available in applications such as outdoor products and power tools where the motor operates at predictable speed ranges. One such technique involves monitoring the motor induced voltage generated by the back-electromotive force (back-EMF) of the motor in the motor windings to detect a rotational position of the motor in a trapezoidal control scheme. Specifically, as the rotor rotates it induces current through a non-active phase of the motor, which can be detected by the controller to estimate a rotary location of the rotor. In this scheme, the rotor angle is detected with a 60-degree resolution in relation to fixed quadrants and the commutation changes as the rotor angle transitions from one quadrant to the next. It would be advantageous to provide a sensorless control scheme that provides a high degree of resolution of the rotor angle for more efficient and accurate commutation.

SUMMARY

According to an aspect of the disclosure, a power tool is provided including a housing, a brushless motor disposed within the housing that includes a stator having windings and a rotor, a power switch circuit that supplies power from a power source to the brushless motor, and a controller configured to apply a drive signal to the power switch circuit to control the supply of power to the brushless motor. In an embodiment, the controller receives at least one signal associated with a phase current of the motor, detects an angular position of the rotor based on the phase current of the motor within a variable speed range of zero to at least 15,000 rotations-per-minute (RPM), and controls the drive signal based on the detected angular position of the rotor to electronically commutate the motor within a power output of zero to at least 1500 watts. Alternatively and/or additionally, the controller controls the motor commutation within a torque range of zero to at least 15 Newton-meters (N.m).

In an embodiment, the controller is configured to apply a vector-space pulse-width modulation (VSPWM) control to the drive signal for field-orientated control of the brushless motor.

In an embodiment, the controller is configured to compute a position difference between the detected angular position of the rotor and a target position associated with a target speed reference, generate an error-correction signal as a function of the computed position difference, and apply the VSPWM control accordingly.

In an embodiment, the power switch circuit includes low-side and high-side switches and one or more shunt components to which the signals associated with the phase currents of the motor are coupled. In an embodiment, the shunt element is provided on an output node of the power switch circuit. In an embodiment, the shunt component is provided in series with one of the low-side switches.

In an embodiment, the power switch circuit includes low-side and high-side switches and the signal associated with the phase current of the motor is coupled to one of the low-side switches to enable the controller to measure the motor phase current using an internal resistance of the low-side switch. In an embodiment, the controller is configured to determine an ON-state of the low-side switches and measure a shunt voltage of one of the low-side switches that in the ON-state to calculate the motor phase current.

In an embodiment, the power tool includes a secondary controller configured to determine at least one of a speed of the rotor or a rotational direction of the rotor and disable supply of power to the motor if the speed of the rotor exceeds a speed threshold or the rotational direction of the rotor is different from a target direction. In an embodiment, the secondary controller is configured to monitor at least one of a sequence or frequency of the phase current of the motor. In an embodiment, the secondary controller is configured to monitor at least one of a sequence or frequency of the drive signal. In an embodiment, the secondary controller is configured to monitor at least one of a sequence or frequency a back electromotive force (back-EMF) voltage of the motor.

In an embodiment, the controller comprises a Cortex-M+ processor core architecture.

In an embodiment, for a motor speed below a speed threshold, the controller is configured to apply a high-frequency injection (HFI) step of injecting a plurality of voltage pulses to the motor and detecting corresponding high-frequency current components to determine the angular position of the rotor.

In an embodiment, for the motor speed above the speed threshold, the controller is configured to apply a sliding-mode observer (SMO) step of estimating a back electromotive force (back-EMF) voltage of the motor based on the phase current of the motor and determining the angular position of the rotor based on the estimated back-EMF voltage.

According to another aspect of this disclosure, a power tool is provided including a housing, a brushless motor disposed within the housing and including a stator and a rotor, a power switch circuit that supplies power from a power source to the brushless motor, and a controller. The controller is configured to receive at least one signal associated with a phase current of the motor, detect an angular position of the rotor based on the phase current of the motor, and apply a drive signal to the power switch circuit to control a commutation of the motor based on the detected angular position of the rotor. In an embodiment, the controller is configured to detect an initial sector within which the rotor is located at start-up, apply the drive signal so as to rotate the motor to a parking angle associated with the detected initial sector, and control a commutation sequence to drive the motor beginning at the parking angle.

In an embodiment, the controller is further configured to apply a high-frequency injection (HFI) step of injecting voltage pulses to the motor and detecting corresponding high-frequency current components to determine the angular position of the rotor.

In an embodiment, the controller is further configured to control the commutation sequence of the motor in open loop and without reference to the angular position of the rotor during a transition period after the motor is parked at the parking angle and before the HFI step. In an embodiment, during the transition period, the controller applies voltage pulses to the motor, detects the corresponding high-frequency current components to estimate a rotor angle, and compares the estimated rotor angle to the parking angle to determine the angular position of the rotor.

In an embodiment, wherein the controller is configured to calculate a motor speed based on the angular position of the rotor and transition from the HFI step to a sliding-mode observer (SMO) step when the motor speed exceeds a threshold. In an embodiment, in the SMO step, the controller is configured to estimate a back electromotive force (back-EMF) voltage of the motor based on the phase current of the motor and determines the angular position of the rotor based on the estimated back-EMF voltage.

In an embodiment, the parking angle is selected from a series of parking angles disposed at 60-degrees apart.

In an embodiment, the power switch circuit includes low-side and high-side switches and each of the parking angles is applied by activating only one of the high-side switches and only one of the low-side switches.

In an embodiment, the drive signal is applied so as to rotate the motor to the parking angle for approximately 10 to 200 milliseconds.

According to another aspect of this disclosure, a power tool is provided including a housing, a brushless motor disposed within the housing and including a stator and a rotor, a power switch circuit that supplies power from a power source to the brushless motor, and a controller. The controller is configured to receive at least one signal associated with a phase current of the motor, detect an angular position of the rotor based on the phase current of the motor, and apply a drive signal to the power switch circuit to control a commutation of the motor based on the detected angular position of the rotor. When a rotor speed is below a speed threshold, the controller applies a high-frequency injection (HFI) step of injecting voltage pulses to the motor and detecting corresponding high-frequency current components to make a first estimation of the angular position of the rotor. When the rotor speed is above a speed threshold, the controller applies a sliding-mode observer (SMO) step of estimating a back electromotive force (back-EMF) voltage of the motor based on the phase current of the motor and making a second estimation of the angular position of the rotor based on the estimated back-EMF voltage. In an embodiment, when the rotor speed exceeds the speed threshold, the controller commutates the motor according to the first estimation of the angular position, gradually modifies the commutation of the motor until the first estimation of the angular position substantially matches the second estimation of the angular position, and commutates the motor according to the second estimation of the angular position thereafter.

In an embodiment, the controller gradually ramps down the HFI step after the rotor speed exceeds the speed threshold.

In an embodiment, when the rotor speed exceeds the speed threshold, the controller concurrently applies the HIF and SMO steps for approximately 1 to 5 milliseconds.

In an embodiment, the controller gradually modifies the commutation of the motor until the first estimation of the angular position is within a margin of error of the second estimation of the angular position.

In an embodiment, in the SMO step, the controller calculates the back-EMF voltage of the motor as a function of the drive signal, the phase current of the motor, and a DC bus voltage input to the power switch circuit.

In an embodiment, in the SMO step, the controller calculates the back-EMF voltage of the motor as a function of motor phase voltage signals and the phase current of the motor.

According to another aspect of this disclosure, a power tool is provided including a housing, a brushless motor disposed within the housing and including a stator and a rotor, a power switch circuit that supplies power from a power source to the brushless motor, and a controller. The controller is configured to receive at least one signal associated with a phase current of the motor, detect an angular position of the rotor by based on the phase current of the motor, and apply a drive signal to the power switch circuit to control a commutation of the motor based on the detected angular position of the rotor. In an embodiment, if the supply of power to the motor is turned OFF to cause the motor to slow down and is turned back ON while the rotor speed exceeds a speed threshold, the controller electronically brakes the motor for a time interval to measure the phase current of the motor and detects the angular position of the rotor based on the measured phase current.

In an embodiment, the power tool includes an ON/OFF switch that selectively cuts off supply of power to the motor based on a user action, and the controller is configured to sense a state of the ON/OFF switch.

In an embodiment, the controller applies a sliding-mode observer (SMO) step to estimate a back electromotive force (back-EMF) voltage of the motor based on the phase current of the motor and detects the angular position of the rotor based on the estimated back-EMF voltage.

In an embodiment, in the SMO step, the controller calculates the back-EMF voltage of the motor as a function of the drive signal, the phase current of the motor, and a DC bus voltage input to the power switch circuit.

In an embodiment, in the SMO step, the controller calculates the back-EMF voltage of the motor as a function of motor phase voltage signals and the phase current of the motor. In an embodiment, after the controller electronically brakes the motor for the time interval to measure the phase current of the motor, the controller calculates the back-EMF voltage of the motor as a function of the phase current of the motor only.

In an embodiment, the speed threshold corresponds to a threshold below which the controller does not apply the SMO step to detect the angular position of the rotor.

In an embodiment, after the controller electronically brakes the motor for the time interval to measure the phase current of the motor, the controller waits for the measured phase current of the motor to fall below a current threshold before it detects the angular position of the rotor based on the measured phase current.

In an embodiment, the speed threshold is in the range of 3,000 to 6,000 rotations-per-minute (RPM).

In an embodiment, if the supply of power to the motor is turned back ON while the rotor speed is smaller than the speed threshold, the controller electronically brakes the motor or allows the motor to coast until the motor speed reaches zero before it begins motor commutation.

According to an embodiment, a power tool is provided including a housing, a brushless motor disposed within the housing and including a stator and a rotor, a power switch circuit that supplies power from a power source to the brushless motor, a trigger switch actuatable by a user configured to selectively cut off supply of power to the brushless motor, and a controller. The controller is configured to receive at least one signal associated with a phase current of the motor, detect an angular position of the rotor by based on the phase current of the motor, and apply a drive signal to the power switch circuit to control a commutation of the motor based on the detected angular position of the rotor. In an embodiment, if the trigger switch is released and reengaged while the rotor speed exceeds a speed threshold, the controller electronically brakes the motor for a time interval to measure the phase current of the motor and detects the angular position of the rotor based on the measured phase current.

In an embodiment, the controller is configured to apply a sliding-mode observer (SMO) step to estimate a back electromotive force (back-EMF) voltage of the motor based on the phase current of the motor and detect the angular position of the rotor based on the estimated back-EMF voltage.

In an embodiment, in the SMO step, the controller calculates the back-EMF voltage of the motor as a function of motor phase voltage signals and the phase current of the motor.

In an embodiment, after the controller electronically brakes the motor for the time interval to measure the phase current of the motor, the controller calculates the back-EMF voltage of the motor as a function of the phase current of the motor only.

In an embodiment, the speed threshold corresponds to a threshold below which the controller does not apply the SMO step to detect the angular position of the rotor.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The drawings described herein are for illustration purposes only and are not intended to limit the scope of this disclosure in any way.

FIG. 13 depicts an exemplary excitation sequence table including high-side and low-side drive signals corresponding to rotor angles V1-V6 within a full rotation of the rotor, according to an embodiment;

FIG. 16 depicts an alternative excitation sequence table including high-side and low-side drive signals corresponding to rotor angles V1-V6 within a full rotation of the rotation of the rotor, according to an embodiment;

Throughout this specification and figures like reference numbers identify like elements.

DETAILED DESCRIPTION

It is to be understood that both the foregoing general description and the following detailed description are exemplary and explanatory only and are intended to provide an explanation of various embodiments of the present teachings.

Figure 1:
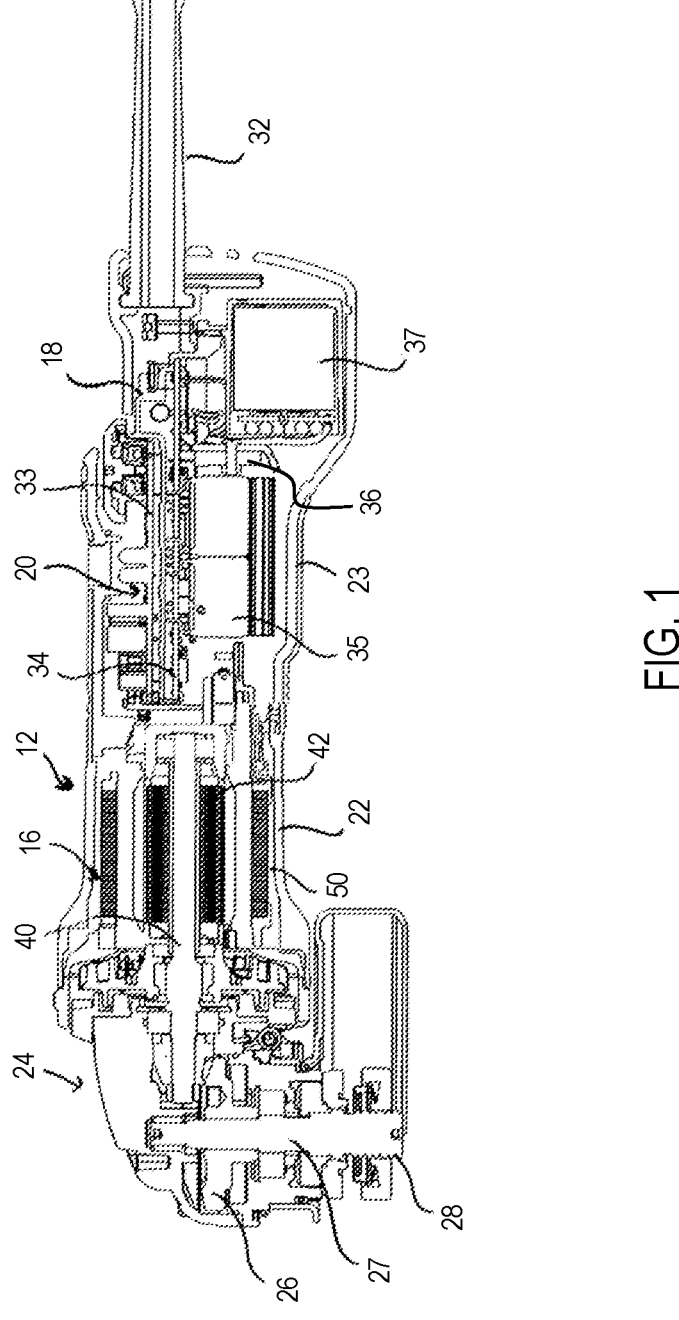
FIG. 1 depicts a side cross-sectional view of a power tool, according to an embodiment.

Referring to FIG. 1, a side cross-sectional view of a power tool 10 is provided. In an embodiment, power tool 10 includes a housing 12, a motor 16 housed therein, a module casing 18, and a planar circuit board 20. The housing 12 includes a motor case 22 that supports the motor 16 and a handle portion 23.

In an embodiment, a gear case 24 is secured to an end of the motor case 22 opposite the handle portion 23. The gear case 24 includes at least one gearset 26, an output shaft 27, and a threaded opening 28 to which an accessory tool is secured, either directly or via a nut (not shown). The gearset 26 is positioned within the gear case 24 and is drivably coupled to the motor 16. The output shaft 27 is drivably connected to the gearset 26 within the gear case 24 and extends perpendicular to the longitudinal axis of the housing 12. A power switch (not shown) is positioned on a side of the motor case 22 and allows for the user to turn the power tool 10 ON and OFF.

In an embodiment, handle portion 23 extends axially from the motor case 22 toward a second end of the housing 12 and includes two clamp shells or housing covers that mate with the module casing 18 around the planar circuit board 20. An alternative-current (AC) power cord 32 is attached to the handle portion 23 at the second end of the housing 12 to supply AC electric power to the power tool 10, though it should be understood that power tool 10 may include a battery receptacle at the end of the handle portion 23 for removeably receiving a battery pack to supply direct-current (DC) power to the power tool 10.

In an embodiment, planar circuit board 20 includes a control circuit board 33 and a power circuit board 34 arranged along the axis of the power tool 10 substantially in parallel. Control circuit board 33 accommodates a controller (not shown) and associated circuitry for controlling the speed and other operation of the motor 16. Power circuit board 34 accommodates a series of power switches (not shown), which may be configured as, for example, a multi-phase inverter switch circuit, that are controlled by the controller and regulate the supply of power from the power cord 32 to the motor 16. Power circuit board 34 further includes one or more capacitors 35 as well as a rectifier circuit 36 that generate a DC voltage on a DC bus line supplied to the power switches.

Additionally, an auxiliary capacitor 37 may be housed at the end of the handle portion 23 that can be switchably connected to the DC bus line when the AC voltage includes large voltage ripples, as described in detail in U.S. Pat. No. 10,050,572 filed Jun. 15, 2017, which is incorporated herein by reference in its entirety.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw bit, thereby allowing the power tool 10 to be used as a power drill or a power screwdriver. For more detail of an exemplary power tool described above, reference is made to U.S. Pat. No. 10,226,849 filed Sep. 12, 2016, which is incorporated herein by reference in its entirety.

In an embodiment, motor 16 is a brushless direct-current (BLDC) motor including a rotor including rotor shaft 40 on which a rotor lamination stack 42 accommodating a series of permanent magnets (not shown) is mounted. The motor 16 further includes a stator including a stator lamination stack 50 on which a series of stator windings 52 are wound. The rotor lamination stack 42 is received within the stator lamination stack 50 and magnetically interacts with the stator windings 52 to cause rotation of the rotor shaft 40 around a longitudinal axis of the tool 10. In an embodiment, as described in detail in this disclosure, motor 16 is a sensorless BLDC motor, meaning it includes no rotor sense magnet or rotor positional sensor to help the controller control the commutation of the motor 16.

Figures 2, 3:
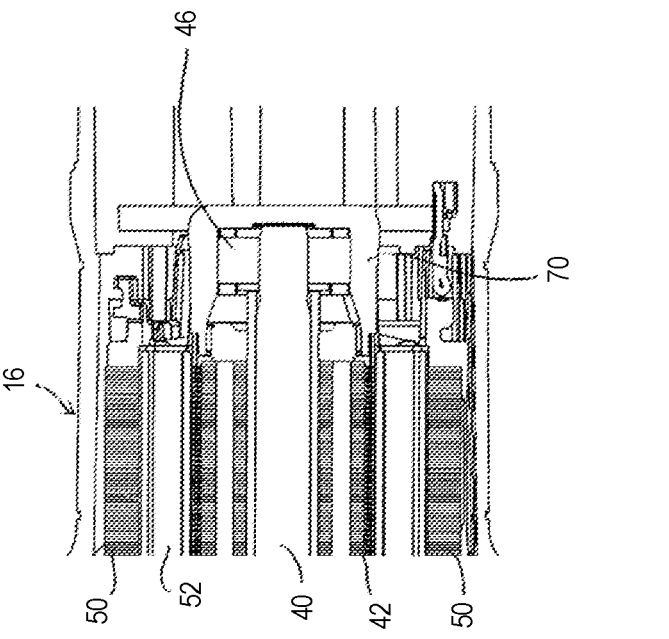
FIG. 2 depicts a partial cross-sectional view of a conventional motor with rotor positional sensors, according to an embodiment.
FIG. 3 depicts a partial cross-sectional view of a sensorless BLDC motor, according to an embodiment.

Referring to FIG. 2, a partial cross-sectional view of a conventional motor with rotor positional sensors is depicted. As shown here, motor 16 is provided with a radial wall or end cap 56 with an opening 58 that receives the rotor shaft 40 therethrough. The end cap 56 forms a bearing pocket 54 via a cylindrical wall 55 around the rotor shaft 40 opposite the rotor lamination stack 42. Bearing pocket 54 securely receives and support a rotor bearing 46 therein to structurally support the rotor with respect to the stator. Additionally, bearing pocket 54 houses a sense magnet ring 44 that is also mounted on the rotor shaft 40. A radial slot 66 formed in the bearing pocket 54 allows for insertion of a positional sensor board 64 in close proximity to the sense magnet ring 44. Rotor positional sensor board 64 supports a series of Hall sensors 60, which sense the position of the sense magnet ring 44 and provide the angular position of the rotor to the controller.

FIG. 3 depicts a partial cross-sectional view of a sensorless BLDC motor according to embodiments of this disclosure. In an embodiment, motor 16 is similar to the motor of FIG. 2 but does not include a rotor sense magnet mounted on the rotor shaft 40 or a rotor positional sensor board secured in close proximity to the rotor to sense the rotor position. Bearing pocket 70 in this embodiment includes a recess facing the motor 16 that is large enough to receive and support the rotor bearing 46. The bearing pocket 70 need not have the length to receive a sense magnet and a positional sensor board and is therefore at most 50% smaller in width than bearing pocket 54 of FIG. 2. This decrease contributes to an overall reduction of 5-20 millimeters from the length of the motor. It also reduces manufacturing costs and eases the assembly process.

Figure 4:
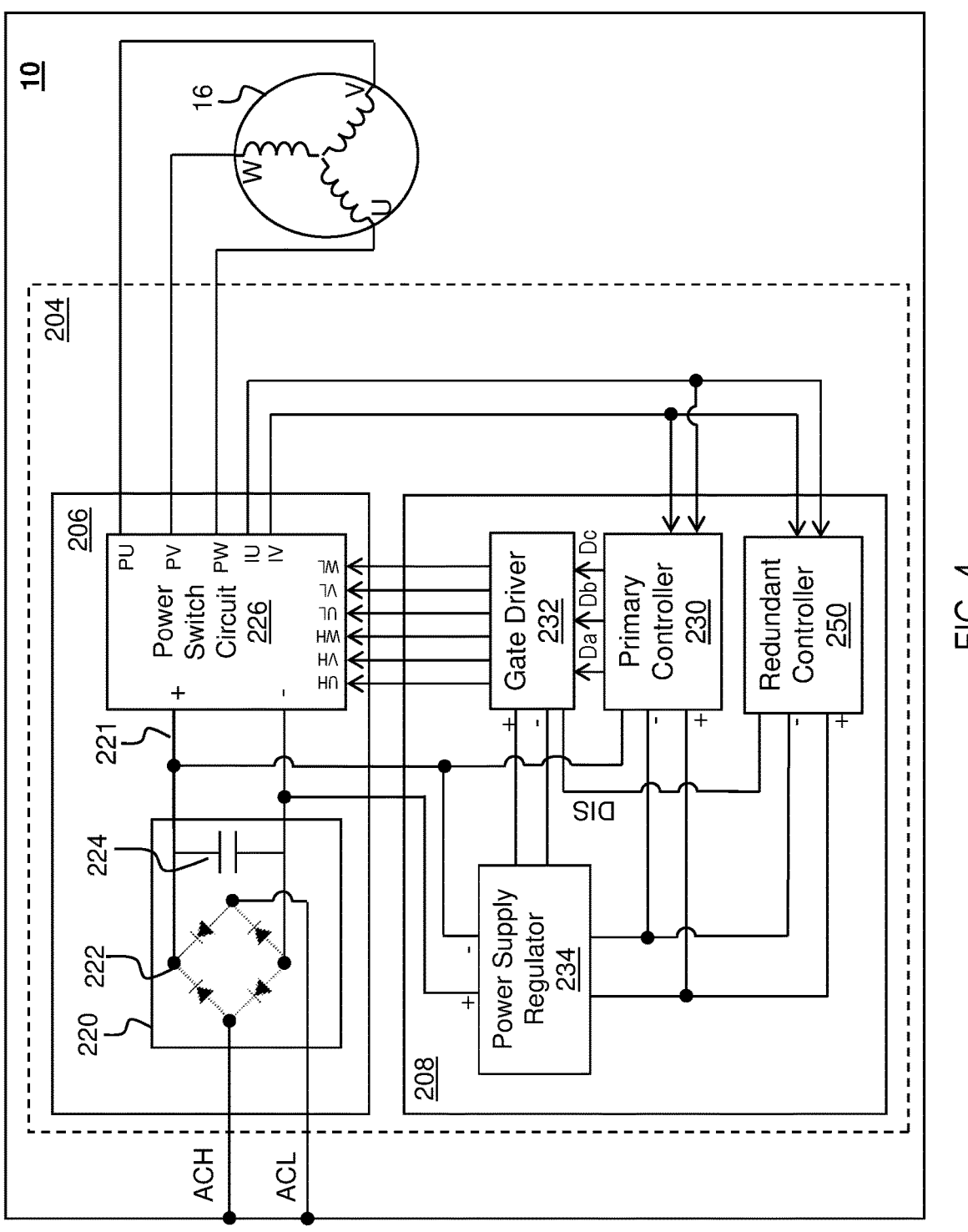
FIG. 4 depicts a circuit block diagram of the power tool including a motor and a motor control circuit, according to an embodiment.

Referring to FIG. 4, a circuit block diagram of power tool 10 including a motor 16 and a motor control circuit 204 is depicted, according to an embodiment. In an embodiment, motor control circuit 204 includes a power unit 206 and a control unit 208. Components of power unit 206 and control unit 208 may be respectively mounted on power circuit board 34 and control circuit board 33 of FIG. 1. In FIG. 4, power tool 10 receives AC power from an AC power source such as AC mains, or DC power from a DC power source such as a removeable battery pack.

As the name implies, BLDC motors are designed to work with DC power. Thus, if power tool 10 is configured to receive power from an AC power source, an embodiment, power unit 206 is provided with a rectifier circuit 220 between the power supply and the power switch circuit 226. In an embodiment, power from the AC power terminals ACH and ACL is passed through the rectifier circuit 220 to convert or remove the negative half-cycles of the AC power. In an embodiment, rectifier circuit 220 may include a full-wave bridge diode rectifier 222 to convert the negative half-cycles of the AC power to positive half-cycles and output a DC waveform on DC bus line 221 provided to power switch circuit 226. Alternatively, in an embodiment, rectifier circuit 220 may include a half-wave rectifier to eliminate the half-cycles of the AC power. In an embodiment, rectifier circuit 220 may further include a bus capacitor 224. In an embodiment, bus capacitor 224 may have a relatively small value to reduce voltage high-frequency transients provided on the DC bus line 221, without significantly smoothing the voltage waveform. In an embodiment, active rectification may be employed for active power factor correction.

In an embodiment, power unit 206 may include a power switch circuit 226 coupled between the power source B+/B− terminals and motor windings to drive BLDC motor 16. In an embodiment, power switch circuit 226 may be a three-phase bridge driver circuit including six controllable semiconductor power devices, e.g. Field-Effect Transistors (FETs), Bipolar Junction Transistors (BJTs), Insulated-Gate Bipolar Transistors (IGBTs), etc.

In an embodiment, control unit 208 may include a controller 230, a gate driver 232, and a power supply regulator 234. In an embodiment, controller 230 is a programmable device arranged to control a switching operation of the power devices in power switching circuit 226. In an embodiment, controller 230 calculates the rotational position of the rotor using a variety of methods. One such method is by measuring the inductive current of the motor 16 to calculate the motor back-EMF (Electro-Motive Force) voltage of the motor and use the motor back-EMF in combination with other factors to calculate the rotor position, as discussed later in detail. Controller 230 may also receive a variable-speed signal from variable-speed actuator or a speed-dial. Based on the calculated rotor position and the variable-speed signal, controller 230 controls commutation sequence of the motor 16. In an embodiment, controller 230 outputs drive signals Da, Db, and Dc to the gate driver 232. In an embodiment, drive signals Da, Db and Dc are generated by controller 230 using a Space-Vector Modulation technique as discussed later in detail. Gate driver generates output drive voltage signals UH, VH, WH, UL, VL, and WL at voltage levels suitable to drive the gates of the semiconductor switches within the power switch circuit 226. Gate driver 232 includes internal circuitry to generate the six voltage signals from the 3 drive signals Da, Db, and Dc. By control a PWM switching operation of the power switch circuit 226 via the drive signals, controller 230 controls the direction and speed by which the motor windings are sequentially energized, thus electronically controlling the motor 16 commutation.

In an embodiment, power supply regulator 234 may include one or more voltage regulators to step down the power supply to a voltage level compatible for operating controller 230 and/or the gate driver 232. In an embodiment, power supply regulator 234 may include a buck converter and/or a linear regulator to reduce the power voltage of the power supply to, for example, 15V for powering the gate driver 232, and down to, for example, 3.2V for powering controller 230.

In an embodiment, a power switch (not shown) may be provided between the power supply regulator 234 and the gate driver 232. The power switch may be a current-carrying ON/OFF switch coupled to the ON/OFF trigger or the variable-speed actuator to allow the user to begin operating the motor 16, as discussed above. The power switch in this embodiment disables supply of power to the motor 16 by cutting power to the gate drivers 232. It is noted, however, that the power switch may be provided between the rectifier circuit 220 and the power switch circuit 226 or other suitable location. It is further noted that in an embodiment, power tool 10 may be provided without an ON/OFF switch, and controller 230 may be configured to activate the power devices in power switch circuit 226 when the ON/OFF trigger (or variable-speed actuator) is actuated by the user.

In an embodiment, controller 230 controls commutation of the motor 16 using a vector control technique referred to as field-oriented control (FOC). FOC is a variable-frequency drive control algorithm that provides several advantages over conventional trapezoidal control or voltage-over-frequency (V/Hz) control schemes often used in power tools having brushless DC motors.

Trapezoidal 6-step commutation control is simple to implement and execute and is therefore a popular option. However, this control scheme can generate high torque ripple, particularly at low speed, which can lead to high vibration and motor noise.

Voltage-over-frequency (V/Hz) control, also known as sinusoidal control, may also be implemented in power tool motor control systems. V/Hz control is a scalar control scheme where a ratio of voltage and frequency is held constant as motor speed (i.e., Hz) changes. This scheme overcomes the torque-ripple issues seen in trapezoidal control by supplying smoothly-varying sinusoidal currents to the motor phases. However, in high speed operations, where the frequency of motor rotation increases, it becomes more challenging to maintain the desired voltage and current using this scheme.

Specifically, V/Hz control scheme is typically performed in open loop with respect to current. V/Hz control effectively provides a given three-phase sinusoidal voltage pattern base on rotor position, where the voltage amplitude is controlled based on motor speed so as to maintain a constant V/Hz ratio. V/Hz control is typically performed in open loop with respect to current. V/Hz control effectively provides a given three-phase sinusoidal voltage pattern base on rotor position, where the voltage amplitude is controlled based on motor speed so as to maintain a constant V/Hz ratio. A Proportional Integral (PI) controller may be provided to reduce motor speed when the current exceeds a current limit, but current and torque is otherwise not well controlled.

FOC is different from sinusoidal control in that a current loop is provided using measured motor currents and without reference to the motor's rotation. FOC thus offers more precise torque and speed control over the complete range of motor operation. Particularly, FOC offers better efficiency for high speed operations as well as operating involving dynamic load changes than V/Hz control.

In FOC, the three phase currents of the stator are measured and converted to two orthogonal components that can be combined in a vector. The first component, known as direct current (Id), is the magnetic flux of the motor induced in the stator windings 52 due to rotation of the rotor within the stator. This component runs parallel to the pole axis of the rotor and does not apply a rotational force on the rotor. The second component, known as quadrature current (Iq), is the torque. This component runs perpendicular to the pole axis of the rotor and applies force generating rotational torque. These two components can be controlled independently. The Id current is typically desired to be 0 to minimize the unwanted direct torque component contributing to current losses for a given motor operating point. The Iq current is driven with the desired torque, which may be set, for example, according to the user's amount of trigger pull. The two orthogonal components are in the rotating reference frame such that current can be controlled irrespective of motor speed. In this way, Id and Iq currents are equivalent to effective DC quantities per a conventional DC motor. By controlling these two currents, the motor torque and speed can be directly controlled.

Figure 5:
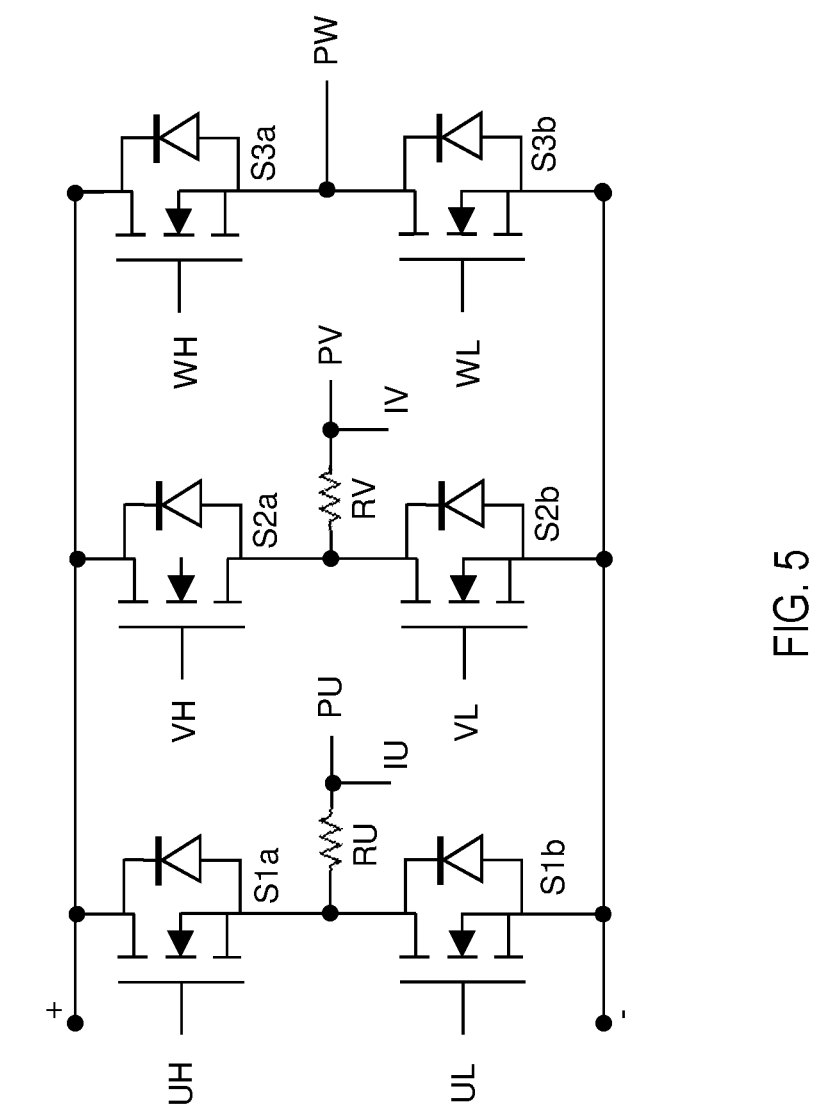
FIG. 5 depicts an exemplary power switch circuit configured as a three-phase inverter bridge circuit including shunt resistors, according to an embodiment.

FIG. 5 depicts an exemplary power switch circuit 226 having a three-phase inverter bridge circuit, according to an embodiment. This circuit corresponds to a three-phase motor including, for example, 3 sets of windings pairs, with each pair wound on two opposite stator teeth. It should be understood that the inverter bridge circuit may include more phases corresponding to the number of phases of the motor. As shown herein, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL. In an embodiment, the drains of the high-side FETs are coupled to the sources of the low-side FETs to output power signals PU, PV, and PW for driving the BLDC motor 16.

In an embodiment, controller 230 constructs a sinusoidal voltage waveform for each phase of the motor by controlling a Space-Vector Pulse-Width Modulated (SVPWM) of the high-side and low-side FETs in accordance with the desired Id and Iq currents, as discussed later in detail. The SVPWM technique is a modulation scheme used to determine duty cycles of the PWM signals for high-side and low-side FETs in order to apply a vector voltage as a combination of three phase voltage signals to the motor. The PWM duty cycles of the FETs are varied within each phase in a way to construct phase voltages that are substantially sinusoidal in waveform and that, when applied to the motor sequentially, cause rotation of the motor in the desired direction and speed.

Using a feedback loop of the phase currents of the motor, controller 230 calculates the rotor position for use in SVPWM commutation control, as described in detail in this disclosure. In this manner, motor 16 may be controlled and commutated without a need for position sensors, such as Hall sensors, thus reducing motor size and manufacturing cost.

Current Measurement

Figure 6:
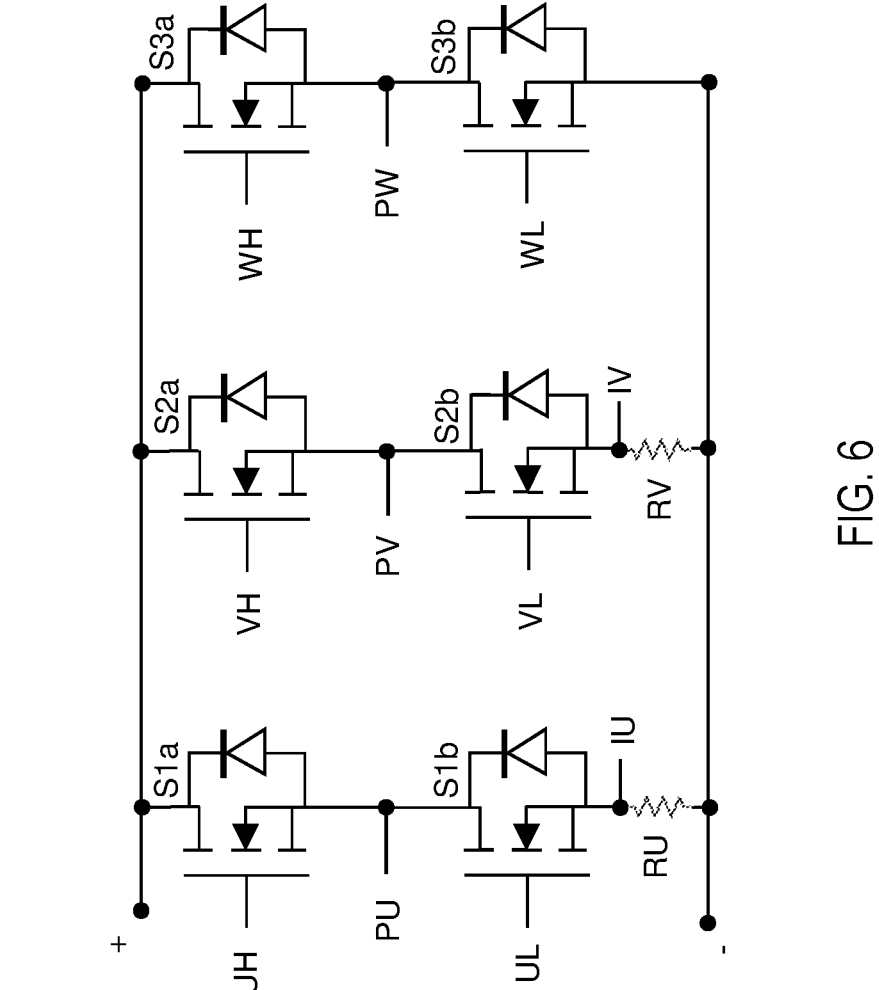
FIG. 6 depicts an exemplary power switch circuit configured a three-phase inverter bridge circuit with an alternative arrangement of shunt resistors, according to an embodiment.

To measure the phase currents of the stator, a series of shunt resistors may be provided along the current paths of the motor phases. In an embodiment, as shown in FIG. 5, shunt resistors RU and RV are disposed between the PU, PV output signals and the motor windings. Alternatively, as shown in FIG. 6, shunt resistors RU and RV are disposed in series with the corresponding low-side FETs, between the low-side FETs S1*b* and S2*b* and the ground terminal of the power supply. By measuring the voltage across these resistors, controller 230 calculates the current passing through corresponding phases of the motor. In FIGS. 5 and 6, the motor phase currents are represented by signals IU and IV for simplicity, though it should be understood that the controller 230 measures the voltage across each shunt resistor RU and RV to calculate the phase current. Thus, in FIG. 5, controller 230 receives voltage signals on both nodes of RU and RV to calculate the currents IU and IV. In FIG. 6, controller needs to receive only one node of RU and RV, since the other node of RU and RV is commonly coupled to the negative terminal of the power supply.

In these embodiments, controller 230 needs only measure two of the phase currents IU and IV and calculate the third phase current IW using Kirchhoff's current law, IU+IV+IW=0. It should be understood that controller 230 may alternatively receive other combinations of two signal currents (i.e., IU and IW, or IV and IW). Alternatively, controller 230 may receive all three current signals and rely on Kirchhoff's current law as means of redundant current measurement to ensure against circuit component failure.

In power tool applications, particularly cordless tools where size is limited, addition of the two or three shunt resistors described above to the power tool circuit presents challenges. In an embodiment, instead of the three additional shunt resistors, the resistive characteristics of the FETs are taken advantage of to measure the motor current.

In an embodiment, no dedicated shunt resistors are provided, and the low-side FETs themselves are used for current measurement. The FETs have a predominantly resistive conduction mode when in the ON-state, which can be of the order of a few milliohms or less. Thus, in an embodiment, the resistive conduction of the low-side FETs is leveraged in place of shunt resistors, allowing controller 230 to calculate the current on each motor phase. By way of example, in FIG. 6, instead of measuring current using shunt resistors RU and RV and via signals IU and IV, controller 230 measures current passing through low-side FETs S1*b*, S2*b*, and S3*b* via signals PU, PV and PW, as described below.

Figure 7:
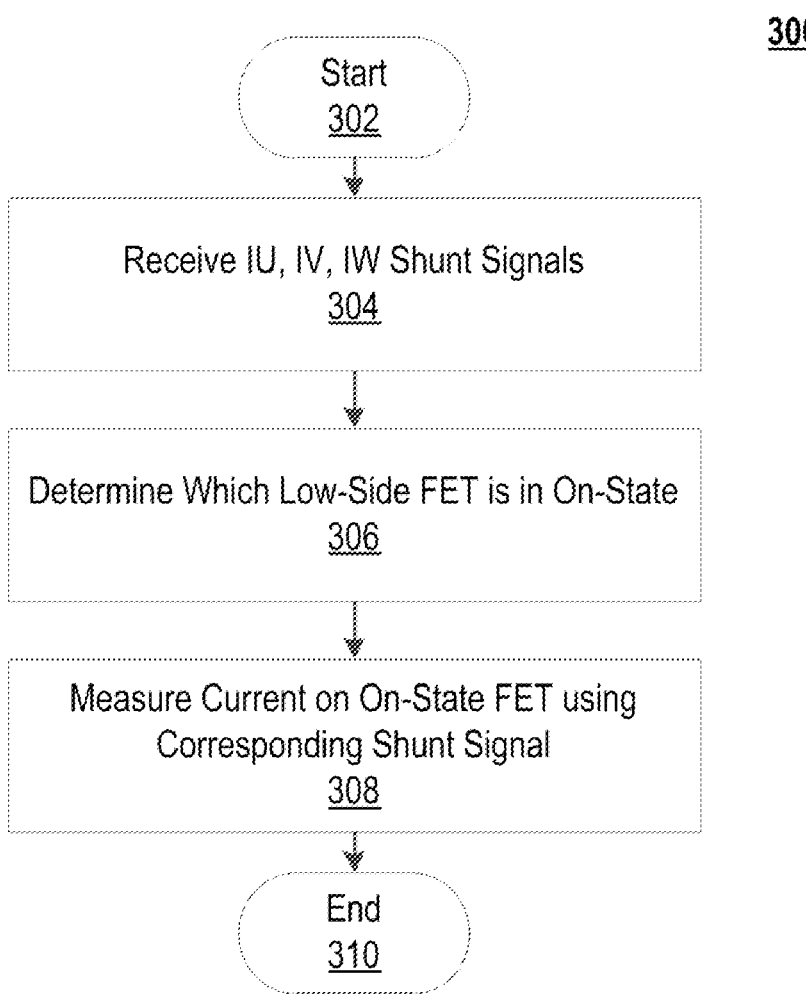
FIG. 7 depicts an exemplary flow diagram of a process for measuring motor current using the low-side FET resistive conduction characteristics, according to an embodiment.

FIG. 7 depicts an exemplary flow diagram of a process 300 executed by controller 230 to measure motor current using the low-side FET resistive conduction characteristics. In an embodiment, beginning with step 302, controller 230 receives the shunt voltage (i.e. voltage across the source and drain) of each low-side FET via shunt signals IU, IV, and IW at step 304. At any given time, controller 230 determines which of the low-side FETs is in the ON-state (i.e., the gate of which of the low-side FETs is being driven high by controller 230) at step 306, and reads the shunt voltage of the ON-state low-side FET via the shunt signal (IU, IV, or IW) outputted from the ON-state low-side FET to calculate the current across that ON-state low-side FET at step 308. The current across the ON-state low-side FET is determined by Ohms law, where resistance of the low-side FET is a known value. The measured current is the motor phase current corresponding to the ON-state low-side FET.

In an embodiment, for the low-side FET (or FETs) that are in the OFF-state, controller 230 ignores the FET voltage. Additional voltage clamping hardware (not shown) may be provided to clamp the FET voltage when the low-side FET is in the OFF-state, in order to protect controller 230 from getting damaged by high voltage. The process ends at 310.

Secondary Controller

Referring back to FIG. 4, in an embodiment, in addition to controller 230, a secondary controller 250 is provided to determine motor speed and rotation direction. Secondary controller 250 protects the power tool from damage and the power tool user from potential harm in the event of hardware or software failure of controller 230. Such failure may lead to incorrect rotation of the motor or the motor spinning at undesirably high speed, both of which can be potentially harmful to the user.

Secondary controller 250 may be of the same size and processing power as controller 230, or alternatively may be a relatively small and low power processor. For example, secondary controller 250 may be an 8-bit micro-controller (such as a PIC10F200 Microchip®) that is smaller and less expensive than controller 230. Unlike controller 230, secondary controller 250, secondary controller 250 does not control motor commutation or other power tool control functions. Rather, secondary controller 250 is merely programmed to determine the speed and rotational direction of the motor 16 and to shut down power to the motor 16 in the event it detects an overspeed condition or incorrect rotation of the motor 16. In an embodiment, secondary controller 250 shuts down power to the motor 16 by activating a disable signal that disables the gate driver 232, as shown in FIG. 4. Alternatively, secondary controller 250 may deactivate a semiconductor switch (not shown) disposed on the current path from the power supply to the power switch circuit 226, from the power supply to the power supply regulator 234, from the power supply regulator 234 to the gate driver 232, or any other suitable location. Secondary controller 250 ensures, that in the event of electrical or software failure by controller 230, the motor 16 does not continue operating at high speed or incorrect direction.

In FIG. 4, secondary controller 250 receives feedback current signals IU, IV, IW from the power switch circuit 226 and monitors the sequence of current signals to determine direction of rotation of the motor, and the frequency of the current signals to determine the speed of the motor. Secondary controller 250 shuts down power to the motor 16 if it detects either an overspeed condition or an incorrect direction of rotation based on the current signals. In an embodiment, secondary controller 250 makes this determination using only two of the three current signals IU and IV.

Figure 8:
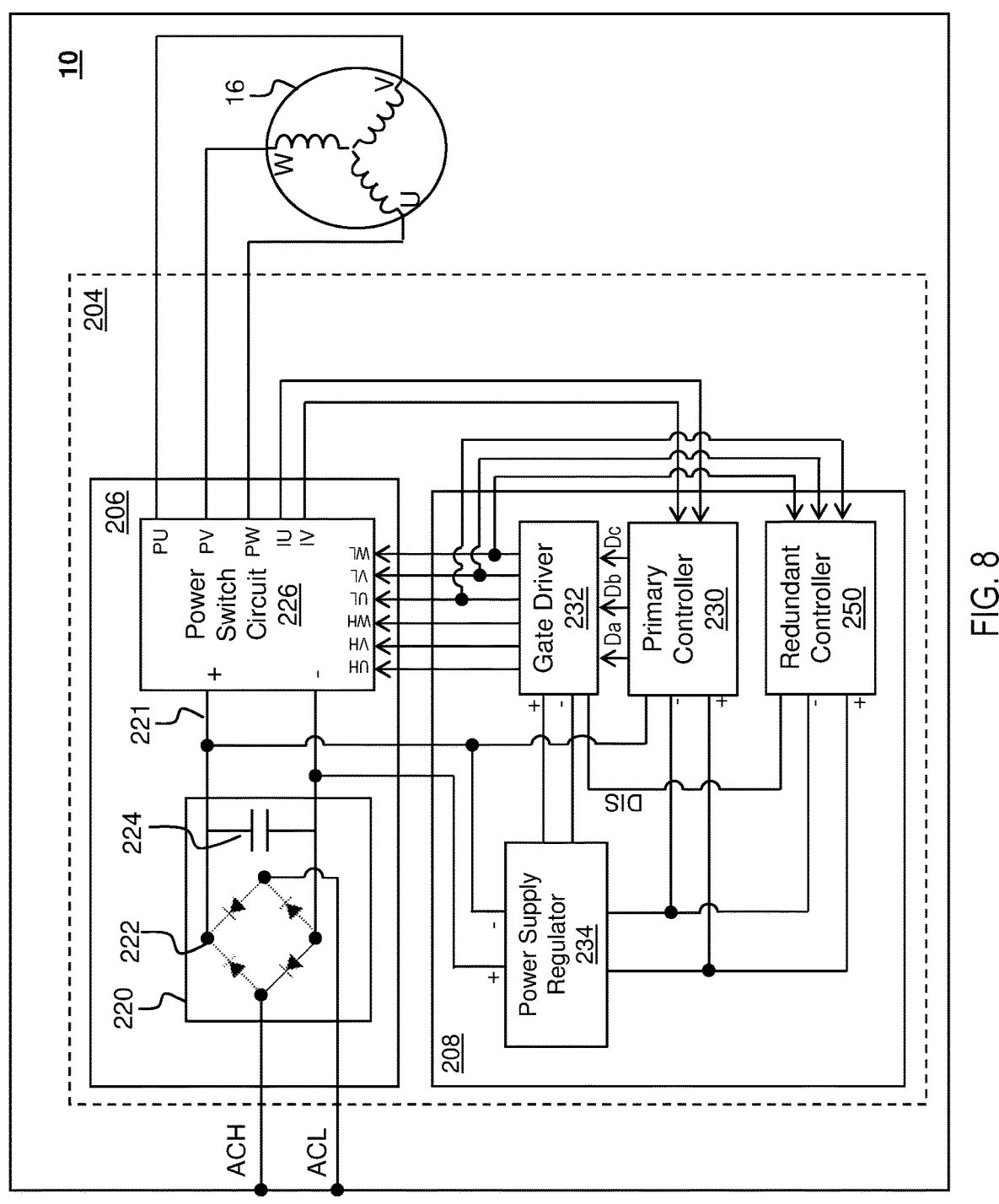
FIG. 8 depicts a circuit block diagram similar to FIG. 4 but with an alternative secondary controller input configuration, according to an embodiment.

FIG. 8 depict an exemplary circuit block diagram of power tool 10 that similar in many aspects to FIG. 4 above, except that secondary controller 250 does not detect motor speed or direction of rotation based on phase currents. Rather, in this embodiment, secondary controller 250 receives at least two (in this example, three) of the drive control signals (i.e., gate driver 232 output signals) and determines motor speed and rotation direction based on the frequency and sequence of said signals. In an embodiment, secondary controller 250 monitors the voltage waveform on the gate driver 232 output signals, determines motor speed based on the frequency of voltage change on the gate driver 232 output signals, and determines direction of rotation based on the sequence of voltage changes on the gate driver 232 output signals. It is noted that at least two drive signals are needed to determine the direction of rotation of the motor, though motor speed alone can be calculated based on a single drive signal. In an embodiment, the gate driver 232 output signals may be all low-side or all high-side drive signals.

In an embodiment, additional voltage divider and low-pass filter circuitry (not shown) is provided to filter out unwanted frequency above the Nyquist Frequency and bring the voltage of the gate driver 232 output signals to a level suitable for processing by secondary controller 250. Nyquist Frequency as known by those skilled in the art is defined as 1/(2*digitization interval). Digitization interval is the time interval between Analog-to-Digital Converter (ADC) conversion samples utilized by secondary controller 250. This arrangement makes it easier for secondary controller 250 to sample the frequency of voltage change on the gate driver 232 output signals.

In a further embodiment, secondary controller 250 utilizes three low-side gate driver 232 output signals and performs a signal substation computation to further attenuate unwanted frequencies better enhance the fundamental frequency that is to be monitored for speed and reverse rotation detection. In an embodiment, secondary controller 250 subtracts UL from VL, and VL from WL, and compares the two resulting signals for speed and reverse rotation detection. In an embodiment, any two independent subtractions of U, V, and W, will suffice for this implementation. A detailed description of this scheme is provided in U.S. patent application Ser. No. 16/853,140 filed Apr. 20, 2020, which is incorporated herein by reference in its entirety.

In an embodiment, instead of the gate driver 232 output signals, secondary controller 250 performs computations described above on the drive signals Da, Db, Dc (or at least two of said drive signals) outputted by controller 230 to detect speed and rotation of the rotor.

Figure 9:
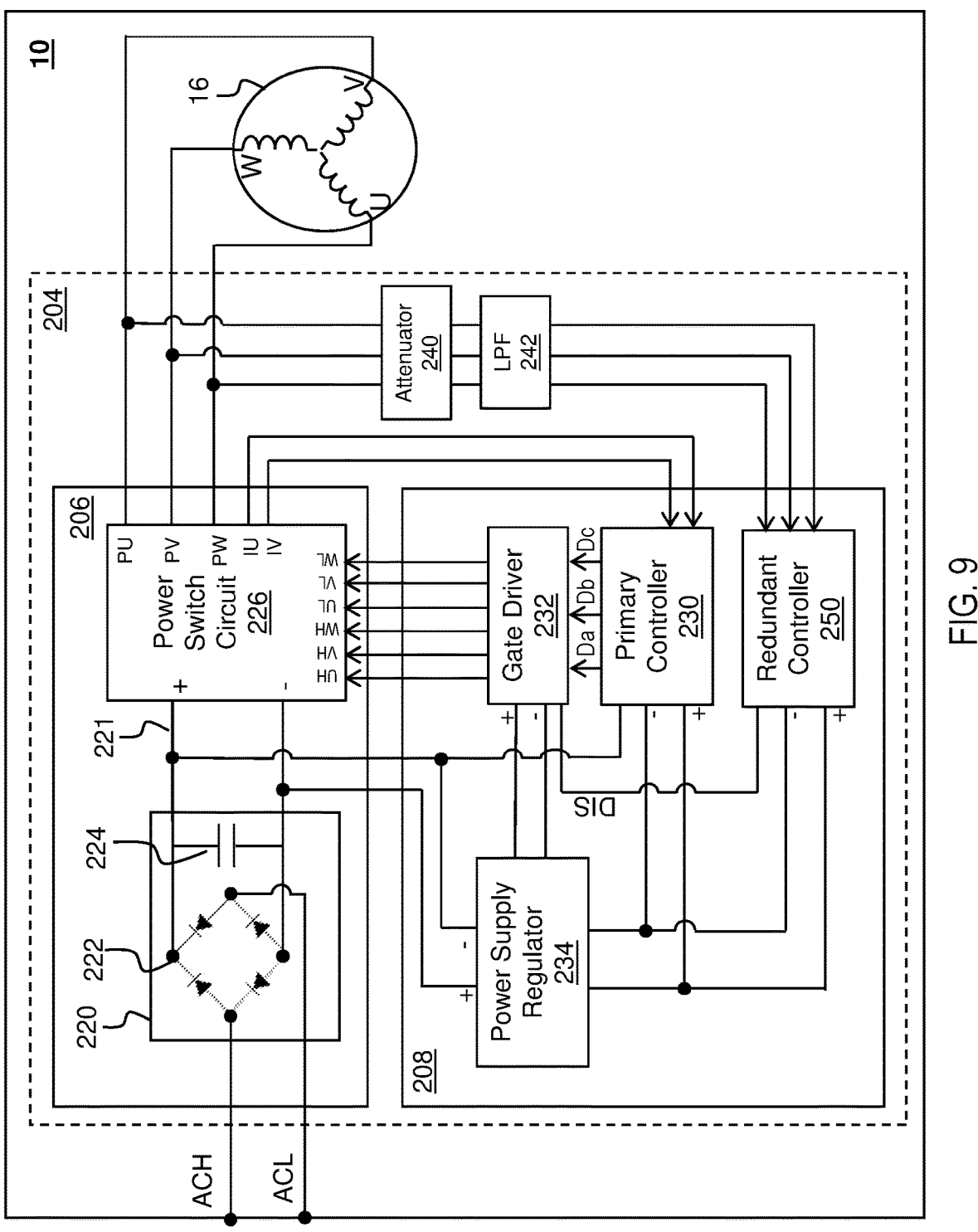
FIG. 9 depicts a circuit block diagram similar to FIGS. 4 and 8 but with yet another alternative secondary controller input configuration, according to an embodiment.

FIG. 9 depicts another exemplary circuit block diagram of power tool 10 that is similar in many aspects to FIG. 4 above, except that the secondary controller 250 detects direction of rotation and speed of the motor based on the back-EMF (Electro-Motive Force) voltage of the motor instead of the motor phase currents. In an embodiment, to detect the motor back-EMF voltage, an attenuator 240 is electrically coupled to the U, V, and W terminals of the motor 16. Attenuator 240 is a voltage divider that, in an exemplary embodiment, includes two resistors, and simply divides the voltage by a constant in order to reduce the motor back-EMF voltage to a voltage that is within the operating voltage range of the motor (e.g., typically 3V or 5V). A Low-Pass Filter (LPF) 242 is coupled to the output of the attenuator 240 to remove impulse noise and, in an embodiment, convert the PWM pulse drain to an analog voltage by averaging the high and low periods of the back-EMF voltage signal. The secondary controller 250 receives three voltage output (or two voltage outputs in an embodiment) from the LPF 242 corresponding to the phases of the motor 16.

In an embodiment, secondary controller 250 is programmed to determine which of the three voltage signals is in open phase (i.e., not being actively driven) based on the shape of the three voltage signals. A phase signal that is in pulse-width modulation is being actively driven by controller 230, whereas a phase signal that is sloped is the open-phase signal carrying the motor back-EMF. Secondary controller 250 in this manner monitors the motor back-EMF and, based on the frequency of the back-EMF zero-crossings, and the sequence of the open phases, it determines the speed and direction of rotation of the motor 16. Secondary controller 250 may also monitor the zero-crossing on only one of the three signals to determine the speed of the motor, and on two of the signals to determine its direction of rotation.

In an embodiment, instead of detecting the zero-crossings of the voltage waveforms, the secondary controller may detect other characteristics of the voltage signals as they transition from high to low or low to high. In this manner, secondary controller 250 protects the power tool 10 from system failure without commutating the motor 16 or even receiving the motor commutation signals.

Field-Oriented Control (FOC)

In an embodiment, controller 230 controls motor commutation by FOC and calculates the angular position of the rotor by analyzing feedback phase current signals from the motor. Depending on the speed of the motor, controller 230 utilizes different algorithms to accomplish this, as described herein in detail.

Figure 10:
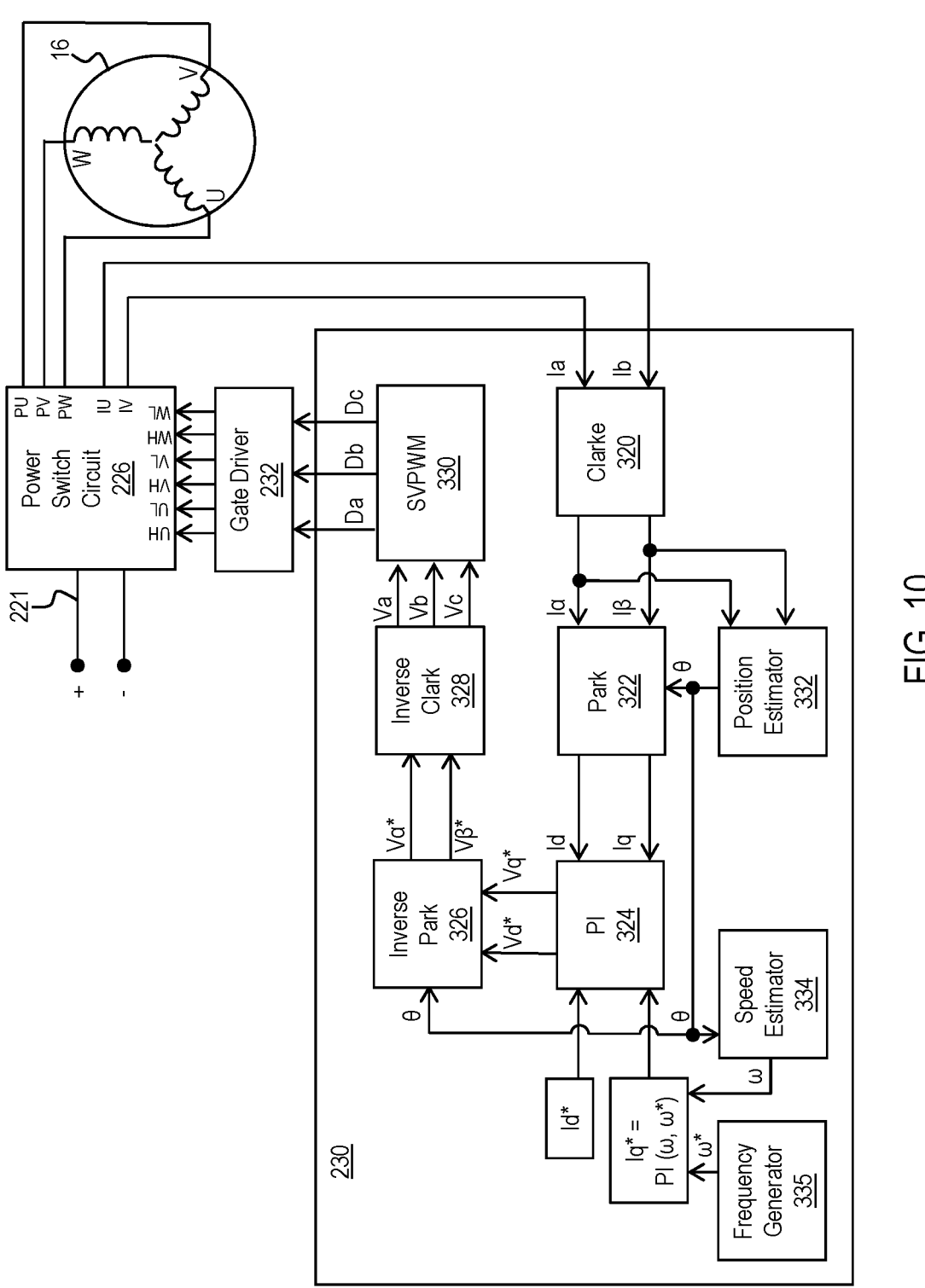
FIG. 10 depicts a partial block system diagram of the power tool showing controller software component blocks for Field-Oriented Control (FOC) execution, according to an embodiment.

FIG. 10 depicts a partial block system diagram of the power tool 10 showing controller 230 software component blocks for FOC execution, according to an embodiment.

In an embodiment, controller 230 is configured (by software) to receive two stator phase current signals Ia and Ib (corresponding to Iu and Iv signals from the power switch circuit 226). Controller 230 calculates the third current using Kirchoff's current relation, Ia+Ib+Ic=0, where Ia, Ib, and Ic are the three phase currents.

In an embodiment, controller 230 includes a Clarke transformation unit 320 that coverts the three phase currents, which are sinusoidal, into a 2-axis coordinate system. Clarke transformation unit 320 produces two signals Iα and Iβ, which are two sinusoidal waveforms that are 90 degrees apart.

Components of the 2-axis coordinate system of the stator currents are time varying and difficult to process using traditional PI processes. Thus, in an embodiment, controller 230 includes a Park transformation unit 322 that converts the two-axis system from a fixed reference to a rotating reference frame that is synchronous with the rotor flux. Park transformation unit 322 uses a rotor position signal θ (discussed below) to covert Iα and Iβ to DC waveforms Id and Iq, where Id and Iq are the in-phase and quadrature components of the stator currents. As described above, the Id current is aligned with the rotor flux, whereas the Iq current is orthogonal to the rotor flux and is therefore responsible for torque generation.

In a BLDC control system including position (Hall) sensors, rotor position signal θ may be derived from the position sensors. Alternatively, controller 230 includes a position estimator 332 that calculates (estimates) the rotor position signal θ using the motor current signals Iα and Iβ. This disclosure described various methods used to estimate rotor position in conjunction with FOC. As will be described later in detail, these methods vary depending on whether the motor is at start-up, low-speed operation, or high-speed operation.

In an embodiment, controller 230 also includes a speed estimator 334 that calculates motor speed w based on frequency of rotor position change in the rotor positional signal θ.

In an embodiment, controller 230 includes a PI (Proportional-Integral) loop controller 324 that compares the corresponding axis vectors with reference currents Id* and Iq* and determines Id error correction signals to generate DC drive voltage signals Vd* and Vq* accordingly. The Id* reference controls the rotor magnetization flux. The Iq* reference controls the torque output of the motor. In many circumstances, since Iq generates motor torque and Id does not, the Id* reference is set to 0 and Iq* is set to a target value. The obtained DC drive voltage signal Vq* corresponds to the amount of voltage correction that is needed to generate enough torque to drive the motor at a desired (target) speed.

In an embodiment, the Iq* may be a fixed value, for example in the range of 10 to 20 A, configured according to the motor specifications to provide sufficient current to drive the motor. Alternatively, Iq* may be a variable value calculated to obtain a target speed that is set based on, for example, the distance of power tool trigger-pull by the user, speed setting on power tool speed dial, etc. In an embodiment, a frequency generator 335 is provided to generate a target speed reference signal ω* as a function of the target speed of the motor. In an embodiment, Iq* is calculated as a PI function of the calculates motor speed w and the target speed reference signal w*.

Since the DC drive voltage signals Vd* and Vq* are on a rotating reference, in an embodiment, controller 230 includes an inverse Park transformation unit 326 that converts the DC drive voltage signals Vd* and Vq* signals back to stationary reference frame drive voltage Vα* and Vβ*. Controller 230 also includes an inverse Clarke transformation unit 328 that converts the stationary reference frame drive voltage signals Vα* and Vβ* from a 2-axis coordinate system back to 3-axis coordinate system comprising three motor phase voltage signals Va, Vb, and Vc.

In an embodiment, controller 230 includes a Space-Vector Pulse-Width Modulation (SVPWM) unit 330, which receives the three phase voltage signals Va, Vb, and Vc and generates drive signals Da, Db and Dc for controlling the switching operation of the power switch circuit 226 accordingly. SVPWM unit 330 controls the duty cycles of the drive signals Da, Db and Dc in such a way that the power switch circuit 226 switches output a substantially sinusoidal phase voltage waveform on each phase Pu, Pv, and Pw of the motor. These sinusoidal phase voltage waveforms are 120 degrees apart and correspond to the three motor phase voltage signals Va, Vb, and Vc. Details of SVPWM is beyond the scope of this disclosure and can be ascertained by persons skilled in the art.

Rotor Position Estimator

Figure 11:
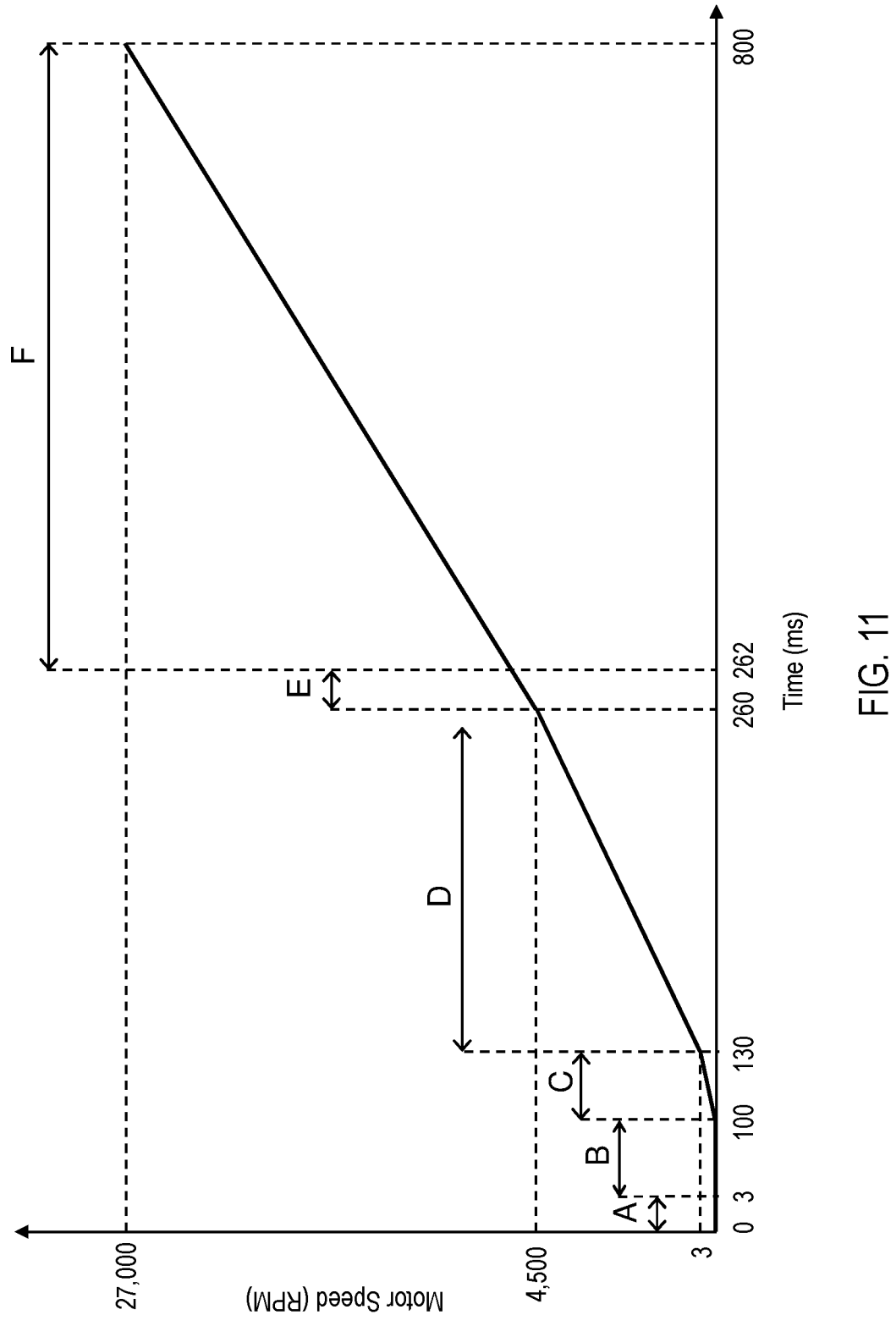
FIG. 11 depicts a speed-time diagram depicting procedures implemented by controller to determine the rotor position from start-up to full speed, according to an embodiment.
Figure 12:
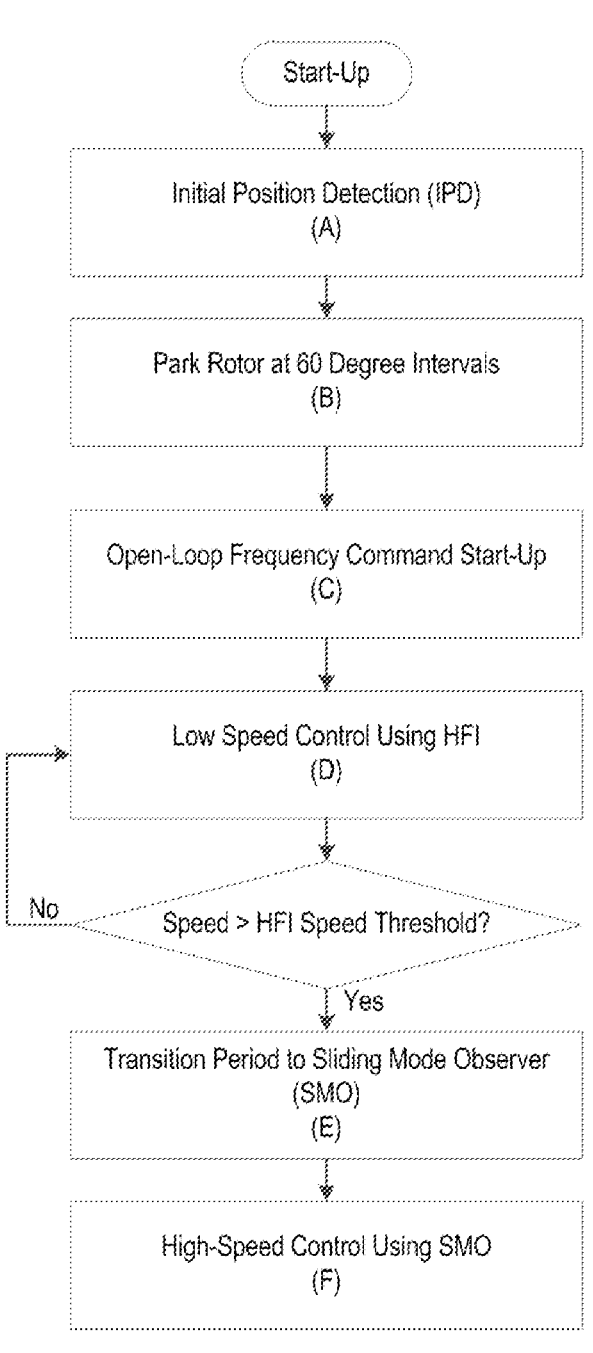
FIG. 12 depicts a flow diagram for a process corresponding to FIG. 11, according to an embodiment.

FIG. 11 depicts a speed-time diagram depicting procedures implemented by controller 230 to determine the rotor position (i.e., position estimator 322 in FIG. 10) from start-up to full speed. In this example, the motor full speed is 27,000 rpm, though it should be understood that this value is by way of example only. FIG. 12 depicts a flow diagram for a process 400 corresponding to FIG. 11.

Conventional sensorless FOC implementations may be found in applications such as washing machines and other home appliances that operate at substantially constant speed and constant torque. In such implementations, after an initial detection of the rotor position, FOC execution may be handle with relative ease without significant changes to the rotor speed or torque output. In power tool applications, however, the rotor speed is subject to rapid change, either based on a change in target speed as determined by depression of a trigger switch or based on a change in torque as the power tool engages a work piece. Embodiments of the invention as described herein provide a technique for reliable detection of the rotor and FOC execution using the detected rotor position in a variable-speed and/or variable-torque environment suitable for a power tool. In an embodiment, this technique may be used to operate a power tool within a variable speed range of zero to at least 15,000 rotations-per-minute (RPM), preferably to at least 20,000 RPM, more preferably to at least 25,000 RPM; within a torque range of zero to at least 15 newton-meters (N.m.), more preferably to at least 20 N.m, and more preferably to at least 25 N.m.; and a power output of zero to at least 1500 watts, more preferably to at least 2000 watts, and more preferably to at least 2500 watts.

Referring to FIGS. 11 and 12, at motor start-up, i.e., after the power tool is initially powered up, controller 230 executes a process herein referred to as Initial Position Detection (IPD) to estimate the rotor position at step A. IPD allows controller 230 to detect the initial angular position of the rotor with approximately a 30-degree accuracy. In other words, controller 230 identifies the motor sector within which the rotor angle is located. In an embodiment, this step is completed within approximately 1-0 ms, in this example 3 ms.

After the rotor sector position is estimated in IPD, in an embodiment, controller 230 proceeds to park the at discrete positions at step B. The reasons for and details of this step are described later in detail. In an embodiment, the parking process entails forcing the motor to rotor to the end of the detected sector, i.e., at discrete positions that are 60 degrees apart. In an embodiment, this step is performed for approximately 50-300 ms, in this example approximately 100 ms.

After parking, controller 230 issues an open-loop frequency command for motor start-up at step C. In this step, while the parking force is still being applied to the motor, controller 230 begins to generate and apply High-Frequency Injection (HFI) voltage signals to the motor. This allows controller 230 to detect the rotor position more accurately via an HFI position estimator described later in detail. Also, this step allows controller 230 to remove the parking current and begin commutating the motor using the detected rotor position to kick-start the motor. In an embodiment, this step is performed in approximately 10-200 ms, in this example approximately 30 ms.

Controller 230 fully transitions to closed-loop control using HFI for a low-speed motor operation at step D. As discussed later in detail, HFI entails applying high frequency voltage pulses to the drive voltage signals and reading the corresponding current to detect the rotor position. Controller 230 continues this process until a speed threshold (herein referred to as the HFI speed threshold) is reached. HFI speed threshold corresponds to the motor speed below which the motor does not generate sufficiently dependable back-EMF phase voltage that can be detected and reliably used by controller 230 to calculate the motor position. Also, in some systems, HFI speed threshold may additionally correspond to the motor speed above which it is difficult to inject and process high-frequency voltages associated with HFI for calculation of motor position. In this example, the HFI speed threshold is 4500 rpm, though it should be understood that the HFI speed threshold can vary depending on the motor and power tool size and power requirements. In an embodiment, the HFI speed threshold is in the range of 2,000 to 7,000 rpm, preferably in the range of 3,000 to 6,000 rpm, more preferably in the range of 4,000 to 5,000 rpm.

Although low-speed operation of steps C and D is described in this disclosure using HFI by way of example, it should be understood that other suitable sensorless start-up and low speed motor control methods may be employed in place of HFI. In one example, motor may be operated using an open-loop kickstart control scheme until the HFI speed threshold is reached. This scheme entails using a preset commutation sequence beginning at the IPD/Parking position and ramping up the motor speed using the preset commutation sequence at open loop, without reference to the rotor position. Alternatively, a sector detection scheme as disclosed in U.S. patent application Ser. No. 16/853,140 filed Apr. 20, 2020, which is incorporated by reference in its entirety, may be employed in place of HFI. In this scheme, controller 230 pauses motor drive control to inject voltage pulses in the present and subsequent sectors. Based on the corresponding current waveforms, controller 230 detects when to commutate the subsequent sector.

At high speed, i.e., at speeds greater than the HFI speed threshold, controller 230 transitions from HFI to a process referred to as Sliding Mode Observer (SMO) at step E. In an embodiment, the transition step may be completed in a few milliseconds. Once the transition period is complete, controller 230 performs closed-loop motor control using SMO at step F at motor speeds above the HFI speed threshold up to the maximum motor speed. In an embodiment, SMO is process for estimating the motor back-EMF using the phase currents. HFI speed threshold described above is typically set to a speed value below which SMO is unable to accurately detect the motor back-EMF using the phase currents, and therefore the HFI process is relied upon instead.

Although step F is described in this disclosure using SMO by way of example, it should be understood that other suitable rotor tracking methods may be employed in place of SMO. Examples of such methods include, but are not limited to, phase-locked loop (PLL) control for tracking the rotor position based on motor currents and applied motor voltages.

Each of the steps A-F is described in detail herein.

Initial Position Detection

Figure 14:
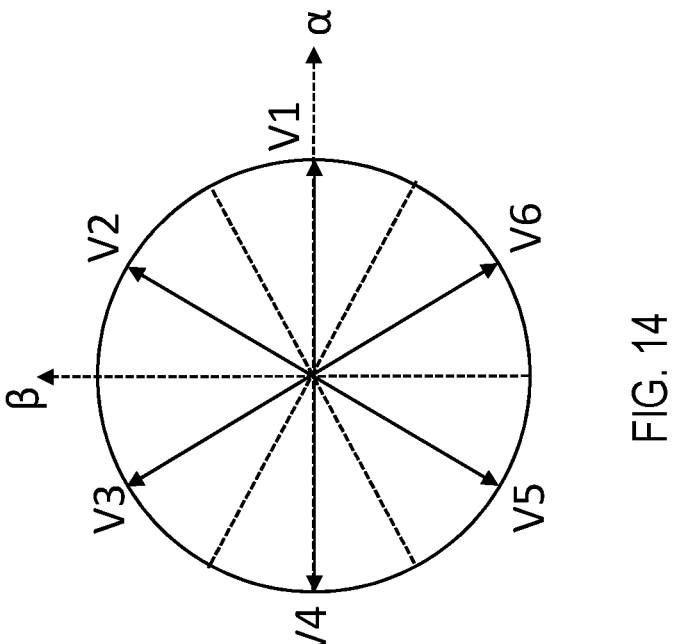
FIG. 14 depicts a diagram representing a full 360-degree orientation of the rotor angles from V1 through V6, according to an embodiment.
Figure 15:
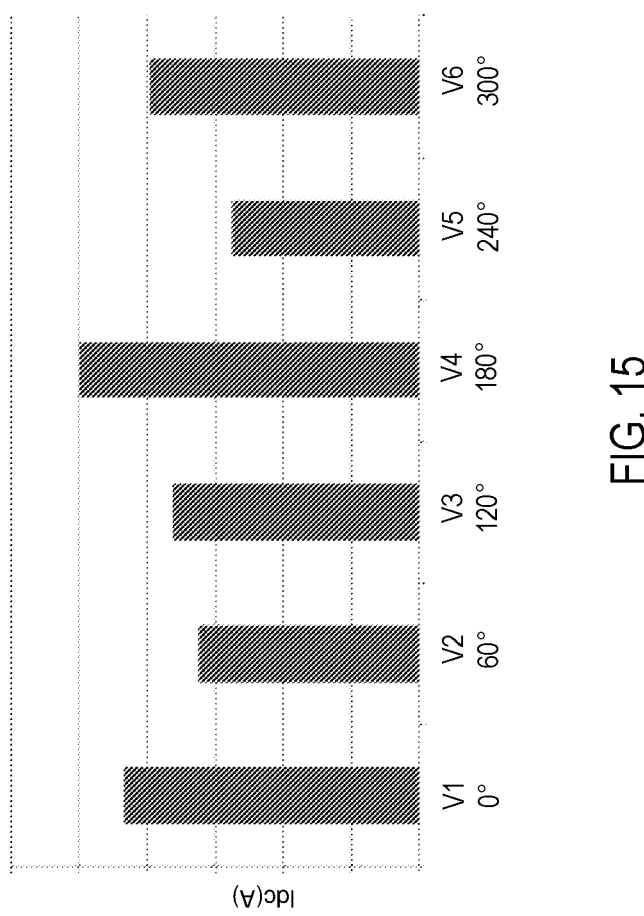
FIG. 15 depicts an exemplary diagram showing measured currents corresponding to each pulse injection for Initial Position Detection (IPD), according to an embodiment.

The process of Initial Position Detection (IPD) (Step A) is described herein with reference to FIGS. 13-15.

FIG. 13 depicts an exemplary excitation sequence table including high-side and low-side drive signals corresponding to rotor angles V1-V6 within a full rotation of the rotor, according to an embodiment. FIG. 14 depicts a diagram representing a full 360-degree orientation of the rotor angles from V1 through V6, according to an embodiment. In this embodiment, V1 through V6 correspond to 60-degree intervals of the rotor orientation beginning at 0 degrees.

IPD allows controller 230 to detect the initial angular position of the rotor with approximately a 30-degree accuracy. In other words, controller 230 identifies the motor sector within which the rotor angle is located. In IPD, controller 230 sequentially injects a series of voltage pulses in accordance with the drive signals of FIG. 13 at rotor angles V1 through V6. Each voltage pulse has the same voltage and duration. In this embodiment, for each voltage pulse, two high-side FETs and a low-side FET, or one high-side FET and two low-side FETs, are simultaneously activated. For example, voltage V1 (corresponding to 0-degree rotor angle) is applied by activating UH, VL and WL signals of the power switch circuit 226, voltage V2 (corresponding to 60 degrees rotor angle) is applied by activating UH, VH and WL signals of the power switch circuit 226, etc.

In an embodiment, after each voltage pulse, controller 230 measures the corresponding motor current using the shunts as previously described. FIG. 15 depicts an exemplary diagram showing the measured current for each pulse. The voltage pulse closest to the actual the position of the rotor generates the highest inductive current. Thus, controller 230 identifies the rotor angle to be in close proximity to the angle associated with the highest-current voltage pulse. In this example, $I_{V4}$ exhibits the largest current amplitude. Thus, it is determined that the actual rotor position is in the proximity of rotor angle V4. In an embodiment, where 6 voltage pulses are applied, controller 230 identifies the rotor position as V4±30 degrees.

The IPD process described here is usually reliable for estimating the sector in which the rotor is located. It has been found, however, that in some instances, the detected current may be too close to distinctly identify the correct rotor position. For example, in FIG. 15, where the rotor position is close to V4 (180 degrees), the two largest current pulses are associated with V1 (0 degrees) and V4 (180 degrees).

In an embodiment, to solve this problem, controller 230 ensures that the largest current pulse is greater in amplitude than the second-largest current pulse by at least a threshold. For example, in FIG. 15, if $I_{V4}$=20 A, $I_{V1}$=17 A, and the threshold=1 A, controller 230 determines that the difference between the two current pulses exceeds the threshold and selects angle V4 as the correct proximate area of rotor position.

However, if threshold is not satisfied, controller 230 may determine the correct angle by examining the neighboring current pulses of the two peak current pulses. The current pulse whose neighboring pulses are on average larger is the correct sector. For example, in FIG. 15, controller 230 can determine whether the neighboring rotor angles of V4 (i.e., V3 and V5) have larger average current pulses than the neighboring rotor angles of V1 (i.e., V2 and V6). Since in this example $(I_{V3}+I_{V5})>(I_{V2}+I_{V6})$, controller 230 determines rotor angle V4 to be the correct proximate area of rotor position, even if the $I_{V1}$ and $I_{V4}$ pulses were closer in magnitude.

FIG. 16 depicts an alternative excitation sequence table including high-side and low-side drive signals corresponding to rotor angles V1-V6 within a full rotation of the rotation of the rotor, according to an embodiment. In this embodiment, rotor angles V1-V-6 respectively correspond to a different range of angles from FIG. 13, in this example 30 to 330 degrees at 60-degree intervals, according to an embodiment. This arrangement allows for only one high-side FET and one low-side FET to be simultaneously activated for each voltage pulse. For example, voltage pulse V1 (corresponding to 30 degrees rotor angle) is applied by activating UH, and WL signals of the power switch circuit 226, voltage pulse V2 (corresponding to 90 degrees rotor angle) is applied by activating VH and WL signals of the power switch circuit 226, etc.

Parking

Figure 17:
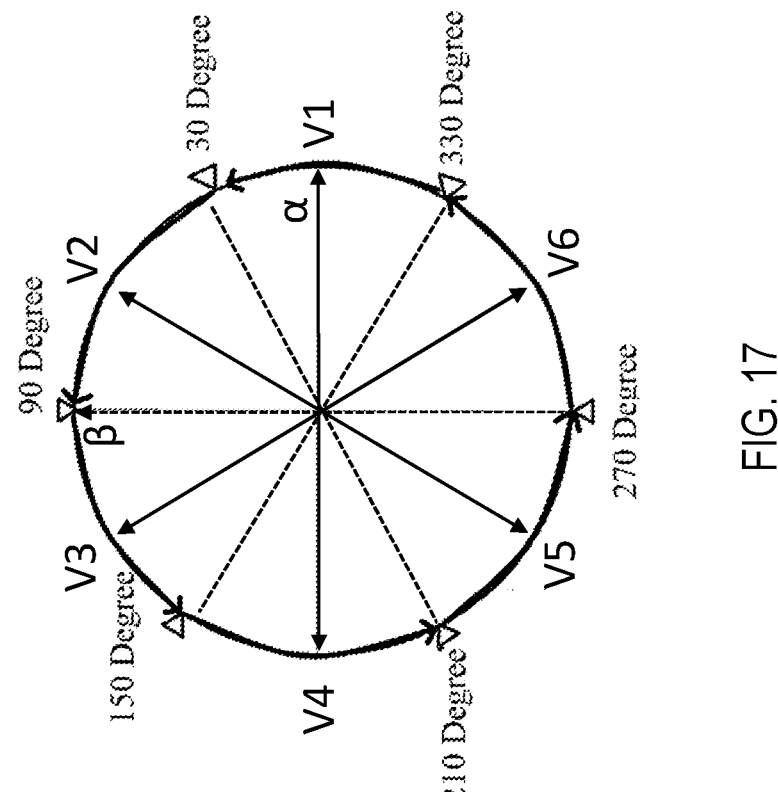
FIG. 17 depicts a diagram representing a full 360-degree orientation of the rotor angles from V1 through V6 with the rotor parked at 30-degree intervals, according to an embodiment.

The parking process (stop B) is described herein with reference to FIGS. 16 and 17, according to an embodiment.

In an embodiment, the IPD process described above allows the controller 230 to robustly identify the location of the rotor with a 60-degree resolution, i.e., within one of six sectors defining the full range of the angular orientation of the rotor. In an embodiment, to enable the controller 230 to begin motor start-up at a more precise rotor angle than the 60-degree resolution provided by IDP, controller 230 is configured to park the rotor at 60-degree intervals. In an embodiment, the rotor parking location is set to 30 degrees after respective angles V1 though V6. In an embodiment, for IPD execution according to FIGS. 13-15, the parking angles are determined according to FIG. 17 and Table 1 below:

TABLE 1

| Rotor IPD Angle | Parking Angle |
|---|---|
| 330 to 30 degree | 30 degree |
| 30 to 90 degree | 90 degree |
| 90 to 150 degree | 150 degree |
| 150 to 210 degree | 210 degree |
| 210 to 270 degree | 270 degree |
| 270 to 330 degree | 330 degree |

In an embodiment, controller 230 executes parking in the desired location by applying the appropriate drive signals the power switches of the power switch circuit 226 for a period that ensures completion of movement of the rotor. This period may be, for example, approximately 50-300 ms, in this example approximately 100 ms.

In an embodiment, controller 230 generates SVPWM drive signals based on the rotor parking angle and drive the power switch circuit 226 accordingly. In an embodiment, controller 230 may toggle between drive signals associated with neighboring angles Vn and Vn+1 of a target angle in order to park the rotor at the target angle. For example, in order to park the rotor at 30 degrees, controller 230 toggles between drive signals associated with 0-degrees (V1 in FIG. 13) and 60-degrees (V2 in FIG. 13) in successive cycles, thus driving VH and VL at a 50% duty cycle.

In an alternative embodiment, parking is executed using a combination of tables of FIGS. 13 and 16. In an embodiment, where IDP is executed using the table of FIG. 13, the parking voltage may be applied using the table of FIG. 16, (e.g., in order to park the rotor at 30 degrees, controller 230 activates UH and WL signals of the power switch circuit 226). Similarly, where IDP is executed using the table of FIG. 16, the parking voltage may be applied using the table of FIG. 13 (e.g., in order to park the rotor at 60 degrees, controller 230 activates UH, VH and WL signals of the power switch circuit 226).

High Frequency Injection (HFI)

Open-loop frequency command start-up (step C) and low-speed control using HFI (step D) are described herein in detail, according to an embodiment.

In an embodiment, HFI is a process by which controller 230 calculates the rotor position at low speed. HFI entails adding high-frequency voltage pulses to the drive voltage signals, and later extracting and measuring currents that correspond to the high-frequency voltage pulses from the motor current to detect the rotor position. Due to the high frequency and low magnitude, these voltage pulses do not carry sufficient current to drive the motor. However, their magnetic interaction with the rotor flux affects the current in a way that is sufficiently measurable by controller 230 to calculate the rotor position.

Figure 18:
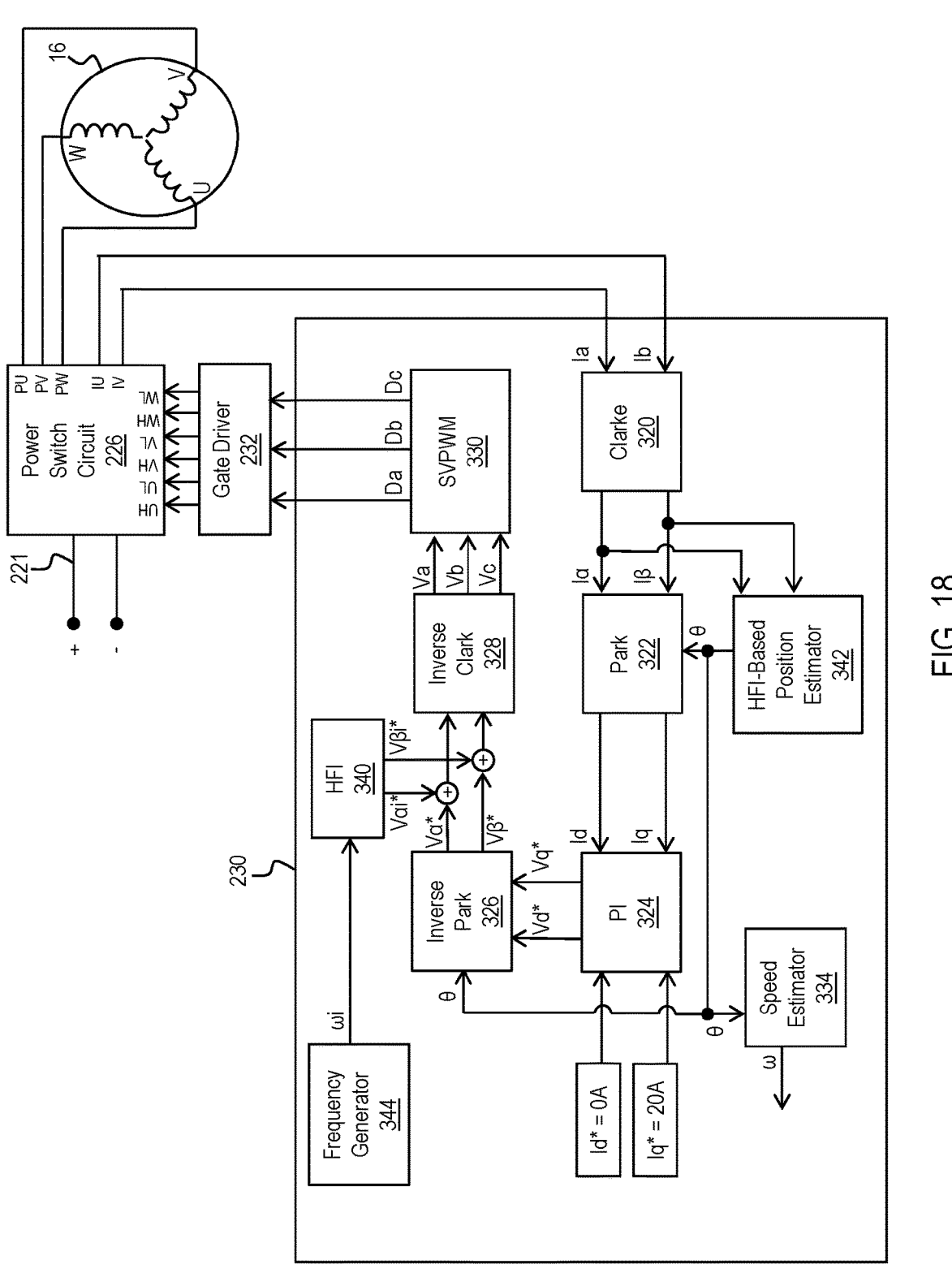
FIG. 18 depicts a partial block system diagram of the power tool using High-Frequency Injection (HFI) for low-speed control, according to an embodiment.

Referring to FIG. 18, a partial block system diagram of the power tool 10 in relation to high-frequency injection for low-speed control is depicted. This figure is similar to FIG. 10 and includes many of the same features, but controller 230 is additionally provided with an HFI unit 340 and a frequency generator 344. Additionally, in this embodiment, the position estimator 332 of FIG. 10 is an HFI-based position estimator 342. These features are described here in detail.

In an embodiment, frequency generator 344 generates a sawtooth function ωi—also referred to as a frequency command—that sets the voltage frequency of the high-frequency voltage pulses. The frequency set by the frequency generator 344 may be pre-set according to motor size, type, power requirements, or other factors.

In an embodiment, the HFI unit 340 receives the frequency command, sets the magnitude of the high-frequency voltage pulses, and multiples the magnitude by the frequency command to generate high-frequency voltage waveforms Vαi*and Vβi*as follows:

$$V\alpha i^* = -Vi^* \mathrm{Sin}(\omega i.t)$$

$$V\beta i^* = -Vi^* \mathrm{Cos}(\omega i.t)$$

where Vi is the amplitude of the injected voltage, ωi=2πfi, and fi is the injection frequency. In an embodiment, the injection frequency is between 1000 to 5000 Hz, preferably between 2000 to 4000 Hz, for example around 3000 Hz. In an embodiment, the Vi amplitude is approximately 20V for a 120V power supply (i.e., ⅙ of the DC bus 221 voltage), with a peak current of 2.2 A.

In an embodiment, the high-frequency voltage waveforms Vαi*and Vβi*generated by HFI unit 340 are substantially sinusoidal. The high-frequency voltage waveforms Vαi*and Vβi*are added to the stationary reference frame drive voltage signals Vα* and Vβ* generated by the inverse Park Transformation unit 326. The sums of the waveforms Vαi*+Vα* and Vβi*+Vβ* is provided to the inverse Clarke Transformation unit 328, which converts these 2-axis voltage signals to three phase voltage signals Va, Vb, and Vc, as previously discussed. The phase voltage signals PU, PV, PW provided to the motor from the power switch circuit 226 accordingly include high-frequency voltage components associate with Vαi*and Vβi*, as well as drive voltage components.

In an embodiment, HFI-based position estimator 342 extracts the high-frequency current components that are associated with HFI from the motor phase current signals. In an embodiment, HFI-based position estimator 342 receives current signals Iα and Iβ from the Clarke transformation unit 320. As previously discussed, current signals Iα and Iβ are sinusoidal waveforms that are 90 degrees apart resulting from execution of Clarke transformation on the three phase-current signals Ia, Ib, and Ic to obtain 2-axis coordinate system. HFI-based position estimator 342 retrieves high-frequency current components associated with the high-frequency voltages injected by HFI unit 340 from the current signals Iα and Iβ. HFI-based position estimator 342 uses the retrieved high-frequency current components to calculate the rotor position and output the rotor position signal θ. As previously discussed, rotor position signal θ is used by Park transform unit 322 to convert the Iα and Iβ to Id and Iq current components on a rotational reference frame, and by the Inverse Park transform unit 326 to convert the DC drive voltage signals Vd* and Vq* signals back to stationary reference frame drive voltage signals Vα* and Vβ*. Rotor position signal θ is also used by speed estimator 334 to calculate motor speed ω.

In an embodiment, it is desired to maintain a certain ratio of high-frequency voltage and drive voltage. If the drive current Iq is set too high by the PI loop unit 324, it does not leave enough bandwidth for injection of high frequency voltage pulses, preventing controller 230 from deciphering the rotor position using HFI. Thus, in an embodiment, Iq* is set to a fixed value, for example, in the range of 10 to 30 A (in this example 20A) depending on motor characteristics. Alternatively, as previously discussed, Iq* may be calculated as a PI function of the calculated speed w and reference target speed ω* so long as sufficient ratio of high-frequency voltage to drive voltage is maintained.

Figure 19:
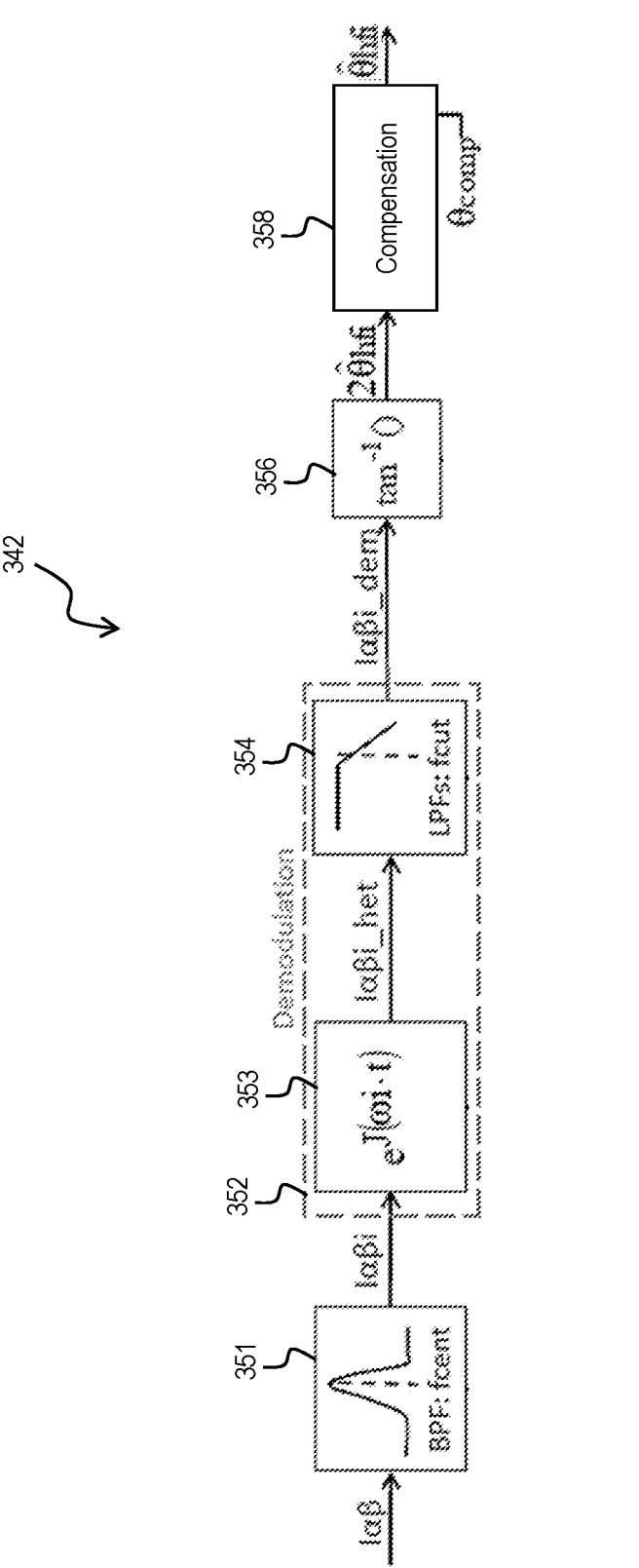
FIG. 19 depicts a block system diagram of an HFI-based position estimator, according to an embodiment.

Referring to FIG. 19, a block system diagram detailing the HFI-based position estimator 342 is depicted, according to an embodiment. In an embodiment, HFI-based position estimator 342 receives current signals current signals Iα and Iβ (represented here as Iαβ) and uses a band-pass filter (BPF) 351 to filter out currents outside a set frequency bandwidth. In an embodiment, the BPF 351 has a center frequency corresponding to the HFI 340 injection frequency (e.g., 3 kHz). This allows the HFI-based position estimator 342 to obtain high-frequency currents Iαβi associated with HFI.

In an embodiment, high-frequency currents Iαβi are then demodulated and filtered in demodulation unit 352 to separate the rotor-induced currents from the HFI currents. Specifically, the high-frequency currents Iαβi are demodulated using Fourier Transform unit 353 to obtain demodulated current signal Iαβi_het, where $$I\alpha i\_het = Ii0.\mathrm{Cos}(2\omega.t) + Ii1.\mathrm{Cos}(2\theta)$$

$$I\beta i\_het = Ii0.\mathrm{Sin}(2\omega.t) + Ii1.\mathrm{Sin}(2\theta)$$

and where Ii1.Cos(2θ) and Ii1.Sin(2θ) components are associated with rotor-induced currents, and Ii0.Cos(2ω.t) and Ii0.Sin(2ω.t) are associated with HFI currents.

In an embodiment, since the rotor-induced currents include the rotor angle information 6, the demodulated current signal Iαβi_het is then passed through a low-pass filter (LPS) 354 to extract the rotor-induced currents represented as Iαβi_dem. A tan-inverse function unit 356 applies a tan-inverse of (Iβi_dem/Iαi_dem) to calculate angle $2\theta_{HFI}$ from the rotor-induced currents Iαβi_dem.

In an embodiment, angle $2\theta_{HFI}$ has a range of 0-360 degrees for 0-180 degrees of rotor rotation. For example, if the rotor is at 90 degrees, $2\theta_{HFI}$=180, and if rotor is at 180 degrees, $2\theta_{HFI}$=360. Thus, angle $2\theta_{HFI}$ is divided by 2 at compensation unit 358. This is the reason why HFI has only a 180-degree rotor visibility. The angle is also compensated for at compensation unit 358, where Qcomp is for example 60 degrees corresponding to phase shift due mainly to the LPF 354. The resulting output is HFI-estimated rotor angle $\theta_{HFI}$.

It is noted that, in an embodiment, the division of $2\theta_{HFI}$ by 2 is not a simple division; rather, this calculation involves monitoring the sample by sample difference of $2\theta_{HFI}$ over time and calculating an integral of the sample differences to construct the rotor angle θ. This is because, as mentioned above, HFI has a rotor visibility of half the rotor position at any given point and ascertaining the exact rotor position that is not offset by 180 degrees requires sampling the rotor movement as well as present detected position.

The HFI process described above can be used by controller 230 to accurately detect the rotor position at low speed (i.e., step D in process 400). However, when transitioning from the parking step (step B) to HFI at start-up, since the 2θHFI division process requires rotor rotation in order to accurately ascertain the correct rotor location, controller 230 performs open-loop frequency command to start-up the motor at step C, described here.

Figure 20:
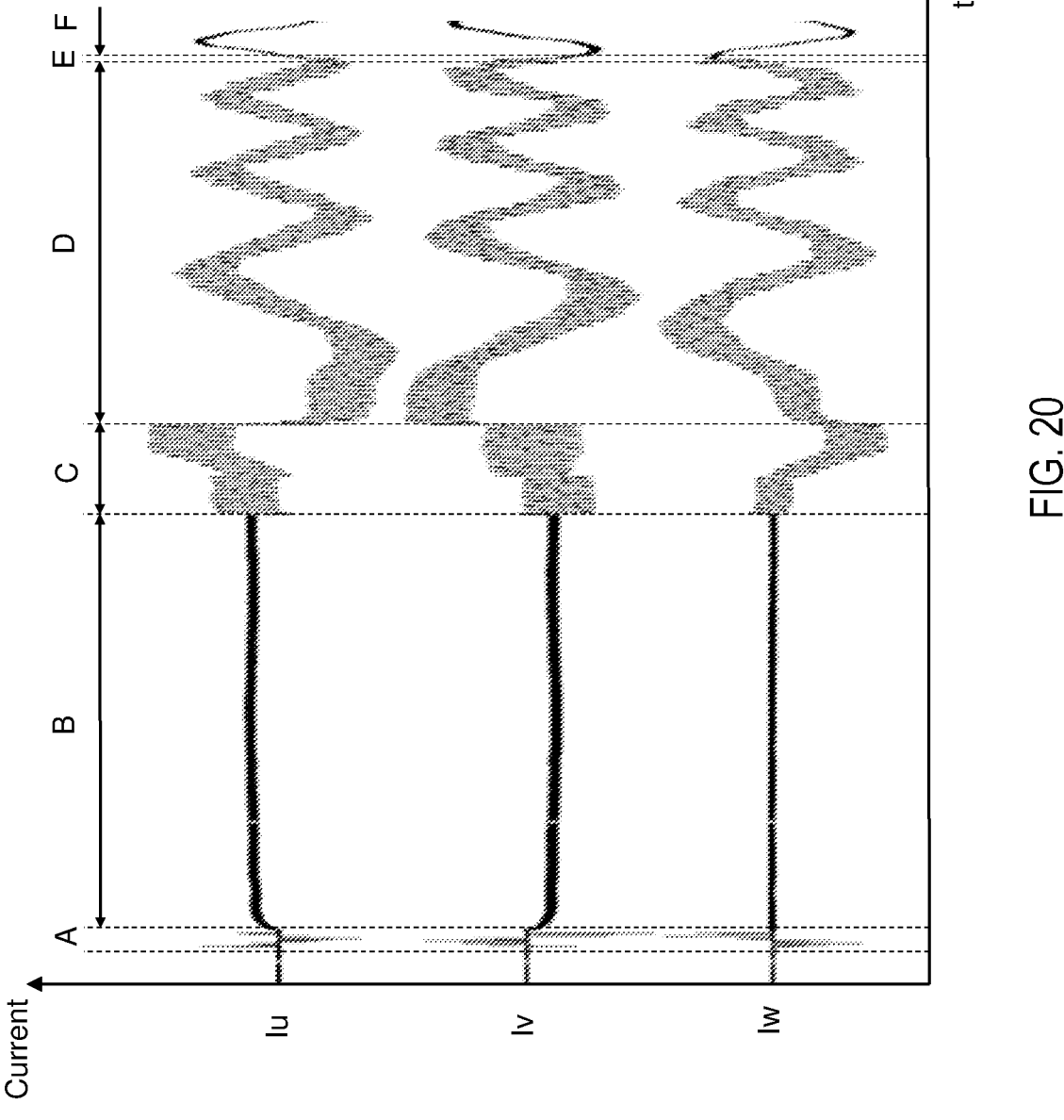
FIG. 20 depicts a current waveform diagram showing the three phase currents Iv, Iu, Iw in low-speed control, according to an embodiment.

FIG. 20 depicts a current waveform diagram showing the three phase currents Iv, Iu, Iw as controller 230 transitions through steps A-F. In an embodiment, in transitioning from the parking step (step B) to open-loop frequency command start-up (step C), controller 230 begins to generate and apply HFI voltage to the motor while the parking force is still being applied. HFI-based position estimator 342 at this point begins to measure the motor current to calculate rotor angle $\theta_{HFI}$, though as discussed above, this rotor angle $\theta_{HFI}$ has a range of 0-180 degrees and thus may be offset by 180 degrees.

To determine the correct rotor angle θ at start-up, controller 230 compares the HFI-estimated rotor angle $\theta_{HFI}$ with the parking angle $\theta_{PARK}$.

Figure 21:
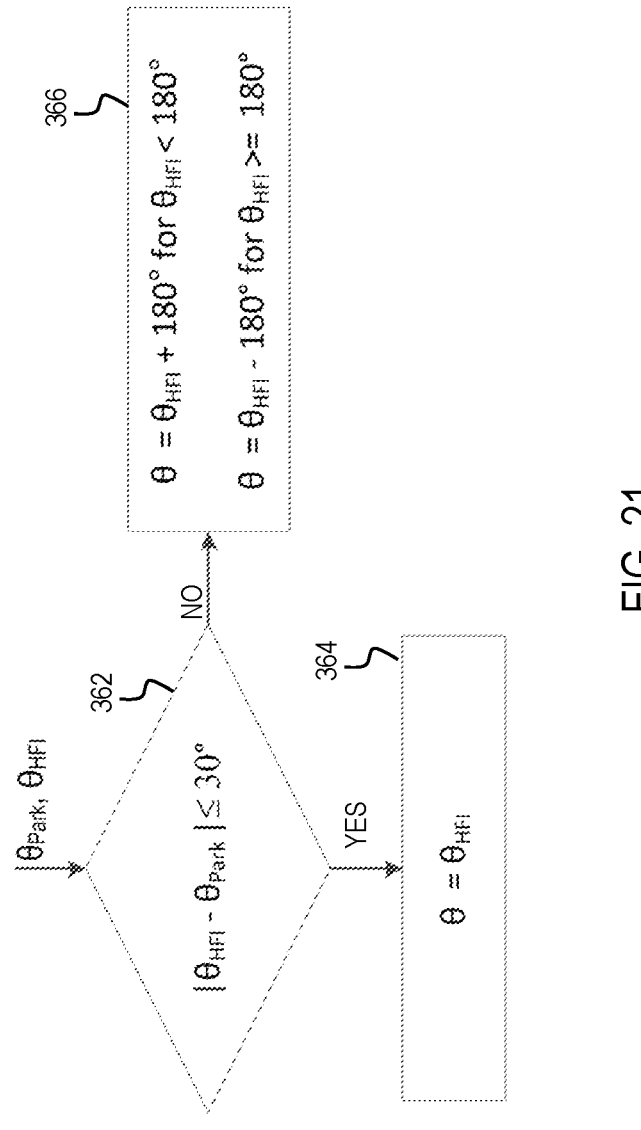
FIG. 21 depicts a flow diagram of a process executed for determining the correct rotor angle θ at start-up using HFI and parking, according to an embodiment.

FIG. 21 depicts a flow diagram of a process 360 executed by controller 230 to determine the correct rotor angle θ at start-up, according to an embodiment. In an embodiment, controller 230 compares the HFI-estimated rotor angle $\theta_{HFI}$ with the parking angle $\theta_{PARK}$ at step 362. Controller sets the start-up rotor angle θ to $\theta_{HFI}$ if the estimated rotor angle $\theta_{HFI}$ is within a predetermined angle range of the parking angle $\theta_{PARK}$ (e.g., within 30 degrees of $\theta_{PARK}$) at step 364. If the estimated rotor angle $\theta_{HFI}$ is outside the predetermined angle range of the parking angle $\theta_{PARK}$, controller 230 sets the start-up rotor angle θ to $\theta_{HFI}$+180 if $\theta_{HFI}$<180 degrees, and to $\theta_{HFI}$−180 if $\theta_{HFI}$>=180 degrees at step 366. This ensures that the start-up rotor angle θ is accurately calculated by HFI and is not off by 180 degrees.

Alternatively, If the estimated rotor angle $\theta_{HFI}$ is outside the predetermined angle range of the parking angle $\theta_{PARK}$, controller 230 simply sets the start-up rotor angle θ to $\theta_{PARK}$. While the parking angle $\theta_{PARK}$ is not as accurate as the HFI angle $\theta_{HFI}$, it is sufficiently accurate for execution of open-loop frequency command for motor start-up.

In an embodiment, controller 230 simultaneously applies HFI and parking voltages to the motor for a relatively short period (e.g., 5-10 ms) to execute the above-described process 360. Thereafter, controller 230 removes the parking current and begin commutating the motor using in open-loop to kick-start the motor. This transition can be seen approximately half-way through step C in FIG. 20. Controller 230 commutates the motor using fixed commutation commands beginning with the start-up rotor angle θ calculated as described above. This process continues until the rotor speed reaches approximately 2-4 rpm (e.g., 3 rpm), at which point the motor has sufficient speed for the compensation unit 358 to accurately calculate the rotor angle θ. Controller 230 then transitions to closed-loop HFI control for low-speed motor operation (step D).

Figure 22:
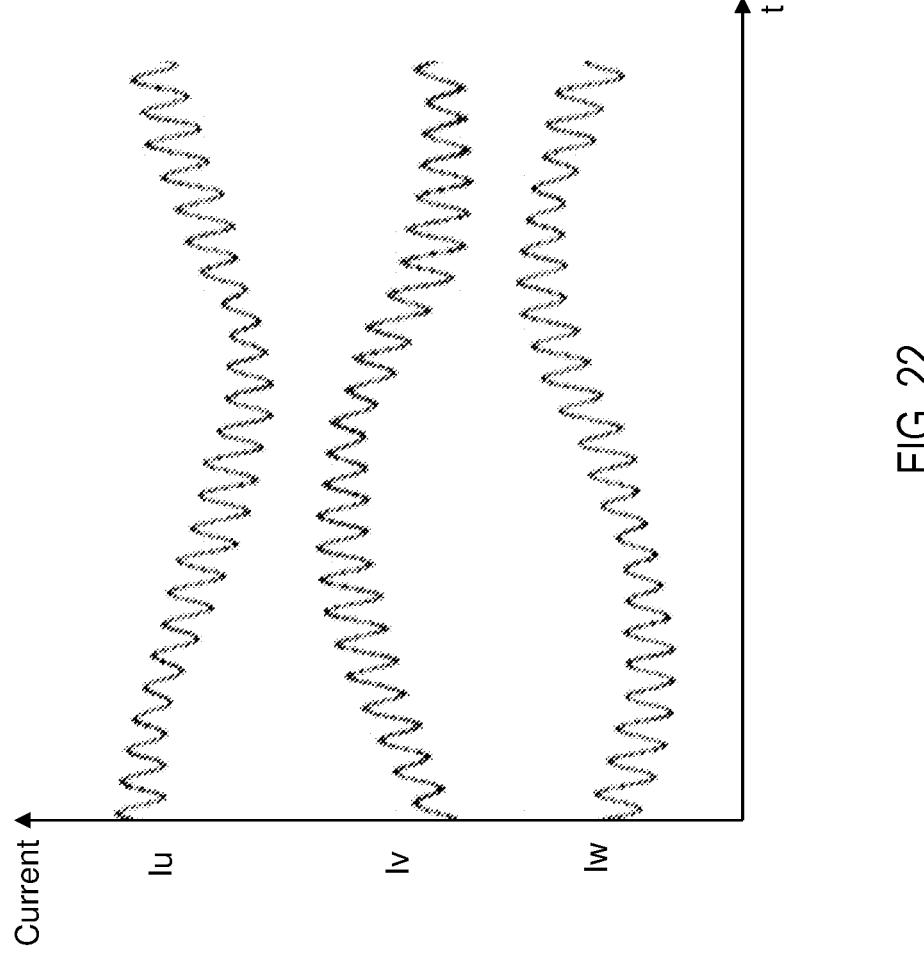
FIG. 22 depicts a zoomed-in view of FIG. 20 showing the three phase currents Iv, Iu, Iw as controller executes closed-loop HFI for low-speed motor operation, according to an embodiment.

FIG. 22 depicts a zoomed-in view of FIG. 20 showing the three phase currents Iv, Iu, Iw as controller 230 executes closed-loop HFI for low-speed motor operation (step D). This zoomed-in view covers approximately a full 360-degree motor rotation cycle. As shown here, HFI pulses are injected with low amplitude and high-frequency to the drive voltage signals, creating voltage ripples along the drive voltage sinusoidal waveform.

In an embodiment, controller 230 continues the low-speed control using HFI (step D) until the HFI speed threshold is reaches. HFI speed threshold corresponds to the motor speed below which the motor does not generate sufficiently dependable back-EMF phase voltage that can be detected and reliably used by SMO process. Also, in some systems, HFI speed threshold may additionally correspond to the motor speed above which it is difficult to inject and process high-frequency voltages associated with HFI for calculation of motor position. The HFI speed threshold may vary depending on the motor and power tool size and power requirements. In an embodiment, the HFI speed threshold is in the range of 2,000 to 7,000 rpm, preferably in the range of 3,000 to 6,000 rpm, more preferably in the range of 4,000 to 5,000 rpm.

Sliding-Mode Observer

Once the rotor speed exceeds the HFI speed threshold, controller 230 begins a transition process (step E) from HFI to SMO for measuring the rotor angle. Since HFI and SMO use different processes to measure rotor position, their rotor angle measurements at times do not match. A sudden transition from HIF to SMO therefore can cause a jolt in the rotor rotation, which should preferably be avoided.

Figure 23:
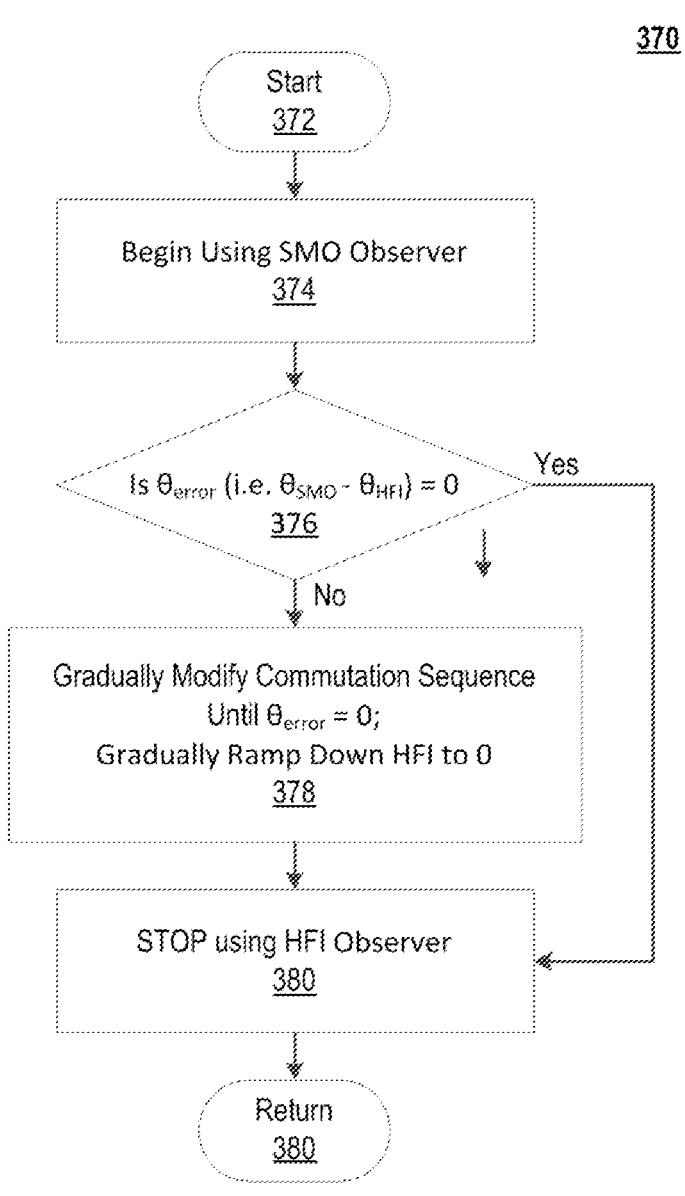
FIG. 23 depicts a flow diagram of a process executed by controller for transition from low-speed control, according to an embodiment.

FIG. 23 depicts a flow diagram of a process 370 executed by controller 230 for transition from HFI to SMO (step E), according to an embodiment. In an embodiment, controller begins this process at 372 and proceeds to start the SMO-based position estimator, which is discussed below in detail, at step 374. The SMO-based position estimator begins to conduct the calculations needed to measure rotor speed $\theta_{SMO}$. Controller 230 is concurrently measuring rotor speed $\theta_{HFI}$ using the HFI process. At step 376, controller 230 calculates an error value $\theta_{error}$ as the difference between $\theta_{HFI}$ and $\theta_{SMO}$ to determine if the two measurements match (or are at least sufficiently close to one another). If the measurements match, controller 230 jumps to step 380, where it stops using the HFI-based position estimator 342 and returns to process 400 shown in FIG. 12 at step 382, where controller 230 execute high-speed control using SMO (Step F) described below. If the two measurements don't match, at step 378, controller 230 gradually ramps up or down the motor commutation sequence until the two measured angles $\theta_{HFI}$ and $\theta_{SMO}$ match or are at least within a small margin of error. Concurrently, controller 230 gradually ramps down the high-frequency injection process until is it fully stopped. Controller 230 proceeds from step 378 to step 380. In an embodiment, process 370 (i.e., step E) takes approximately 1-5 ms (in this example 2 ms).

Once the transition from HFI to SMO (step E) is complete, controller 230 executes SMO alone for rotor angle measurement (step F).

Figure 24:
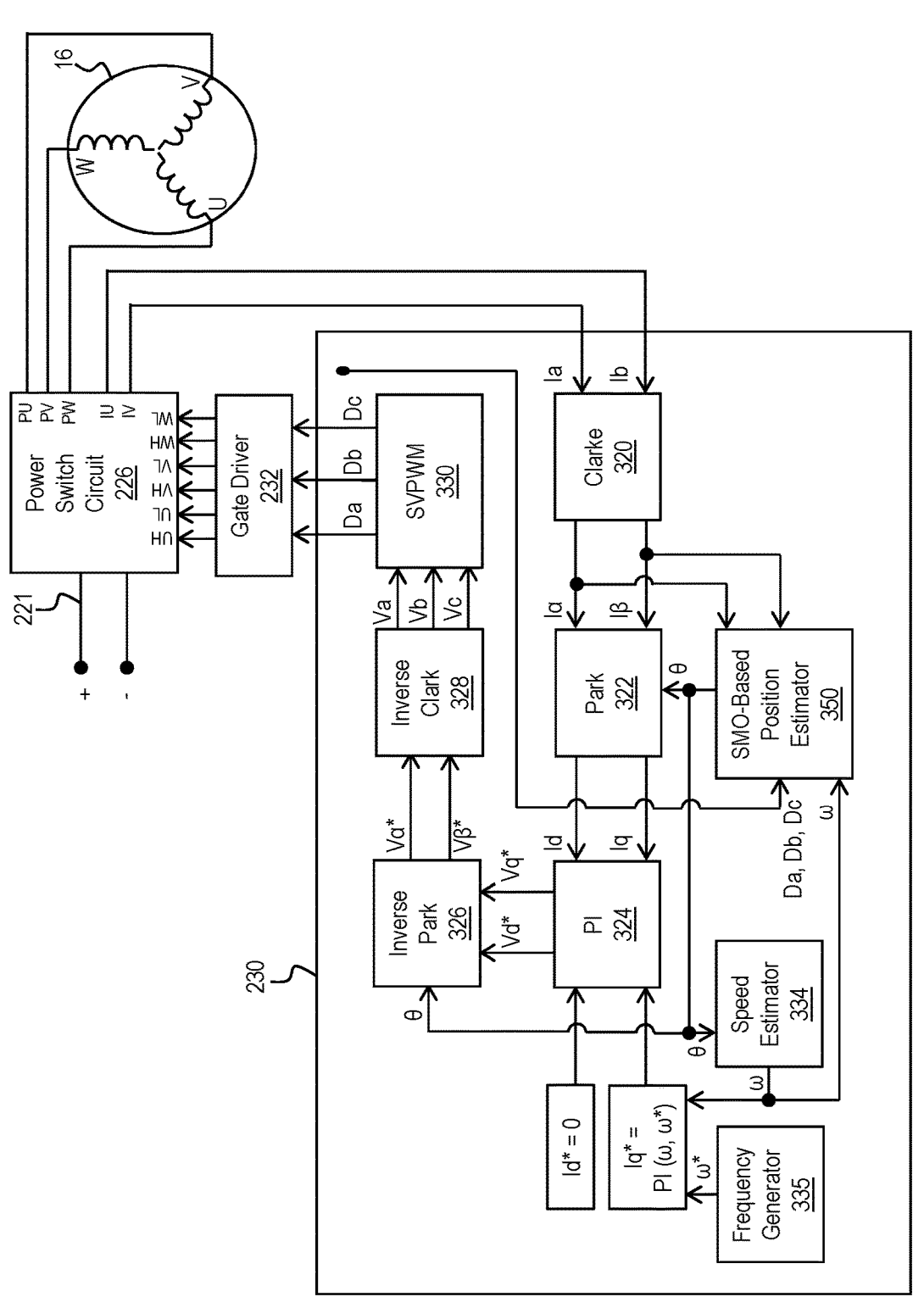
FIG. 24 depicts a partial block system diagram of the power tool using a Sliding-Mode Observer (SMO) for rotor position detection, according to an embodiment.

Referring to FIG. 24, a partial block system diagram of the power tool 10 is depicted. This figure is similar to FIG. 10 and includes many of the same features, where the position estimator is SMO-based position estimator 350. SMO is a process for estimating the motor back-EMF using the motor phase currents and calculating the rotor angle based on the motor back-EMF. SMO-based position estimator 350 receives the current signals Iα and Iβ from the Clarke transformation unit 320. As previously discussed, current signals Iα and Iβ are sinusoidal waveforms that are 90 degrees apart resulting from execution of Clarke transformation on the three phase-current signals Ia, Ib, and Ic to obtain 2-axis coordinate system. SMO-based position estimator 350 also receives drive signals Da, Db, and Dc from the output of SVPWM unit 330, as well as the bus voltage signal 221 and motor speed signal w from speed estimator 334, to calculate the motor voltage being applied to the motor. By comparing the applied voltage and the measured motor current, SMO-based position estimator 350 is able to retrieve the motor back-EMF voltage and use it to calculate the rotor angle θ.

In an embodiment, Id* is set to 0 and Iq* is calculated as a PI function of the calculates motor speed w and the target speed reference signal ω* generated by frequency generator 335, as previously discussed.

Figure 25:
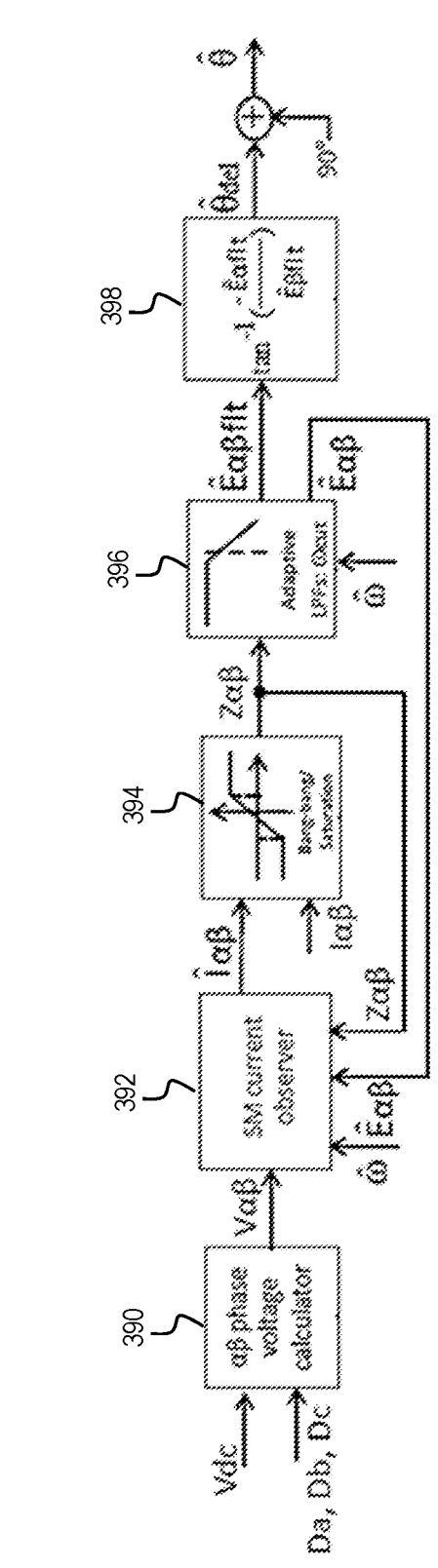
FIG. 25 depicts a block system diagram of SMO-based position estimator of FIG. 24, according to an embodiment.

Referring to FIG. 25, a block system diagram detailing the SMO-based position estimator 350 is depicted, according to an embodiment. In an embodiment, SMO-based position estimator 350 receives current signals Iα and Iβ (represented here as Iαβ), motor speed signal ω, DC bus voltage Vdc, and drive signals Da, Db, and Dc. SMO-based position estimator 350 includes an αβ phase voltage calculator 390 that multiplies the bus voltage Vdd by the drive signals Da, Db, and Dc and obtain sinusoidal voltage signals representing the motor drive voltage. αβ phase voltage calculator 390 also conducts a Clarke transformation on the sinusoidal voltage signals to generate 2-axis sinusoidal voltage waveforms Vα and Vβ (here represented as Vαβ). SMO-based position estimator 350 further includes a Sliding-Mode (SM) current observer 392 that combines the voltage signals Vα and Vβ with the motor speed signal ω, as well as two feedback signals Eαβ and Zαβ, to generate Îαβ. Eαβ represents the calculated motor back-EMF, Zαβrepresents the flux linkage, and Iαβ is the estimated (i.e, predicted) phase current that should be passing through the motor based on these inputs. SMO-based position estimator 350 includes a bang-bang/saturation unit 394 that calculates the flux linkage Zαβ in such a way so as to the minimize the error (difference) between Îαβ and Iαβ. In other words, bang-bang/saturation unit 394 repeatedly modifies the flux linkage Zαβ in the feedback loop to SM current observer 393 until the Îαβ is equal to Iαβ. The resulting flux linkage Zαβmeasurement is provided to adaptive low-pass filters (LPF) 396, which receive the motor speed ω and calculate the motor back-EMF as a function of flux voltage (which depends on motor speed) as follows:

Back-EMF=−d(Zαβ)/dt

A tan-inverse unit 398 calculates angle θdel as a tan-inverse function of the calculated back-EMF voltages Eαflt and Eβflt. This angle is compensated for by a compensation angle (in this example 90 degrees) corresponding to phase shift due mainly to the LPF 396 to obtain SMO-estimated rotor angle θ.

Figure 26:
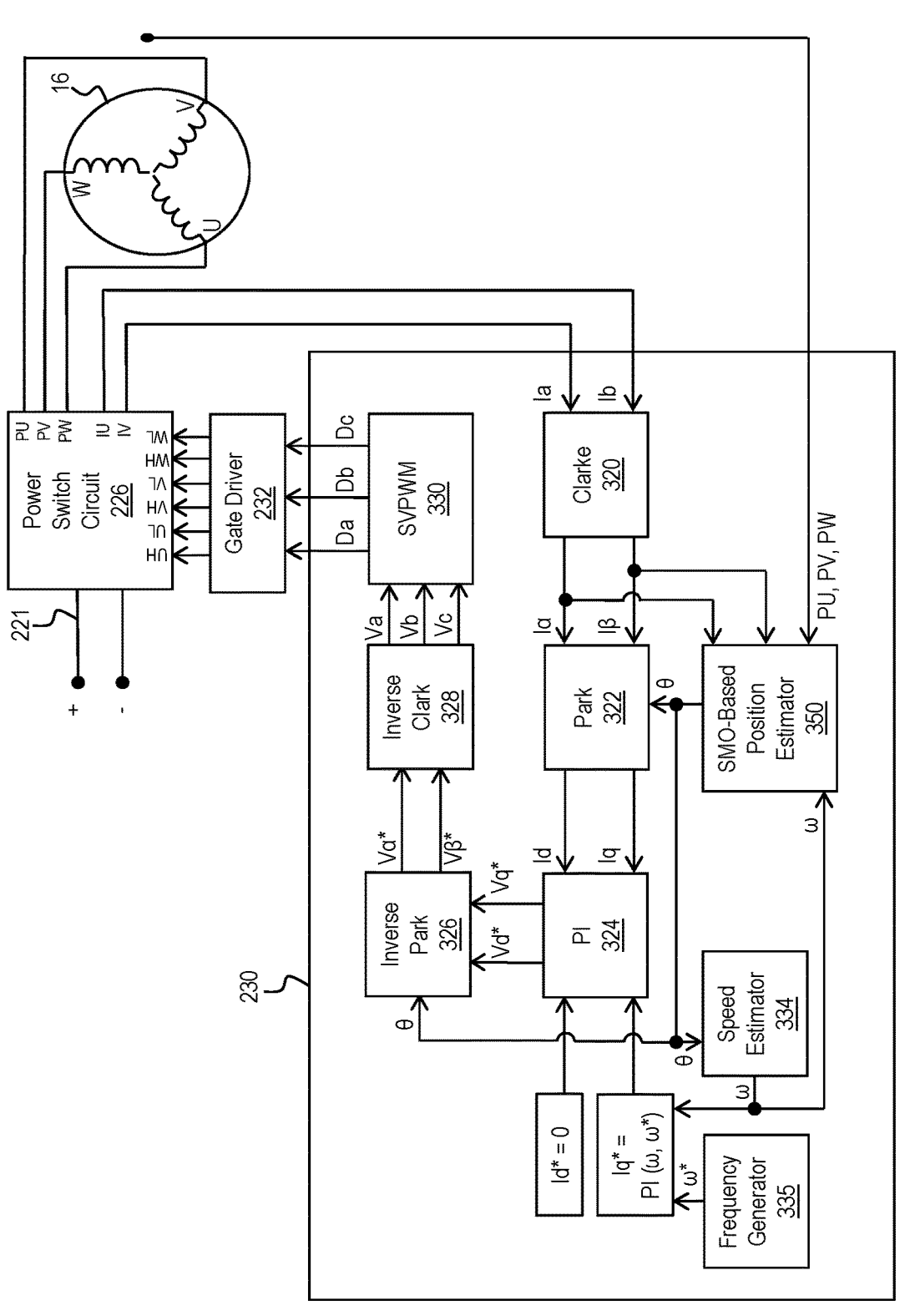
FIG. 26 depicts a partial block system diagram of the power tool in using an alternative Sliding-Mode Observer (SMO) for rotor position detection, according to an embodiment.
Figure 27:
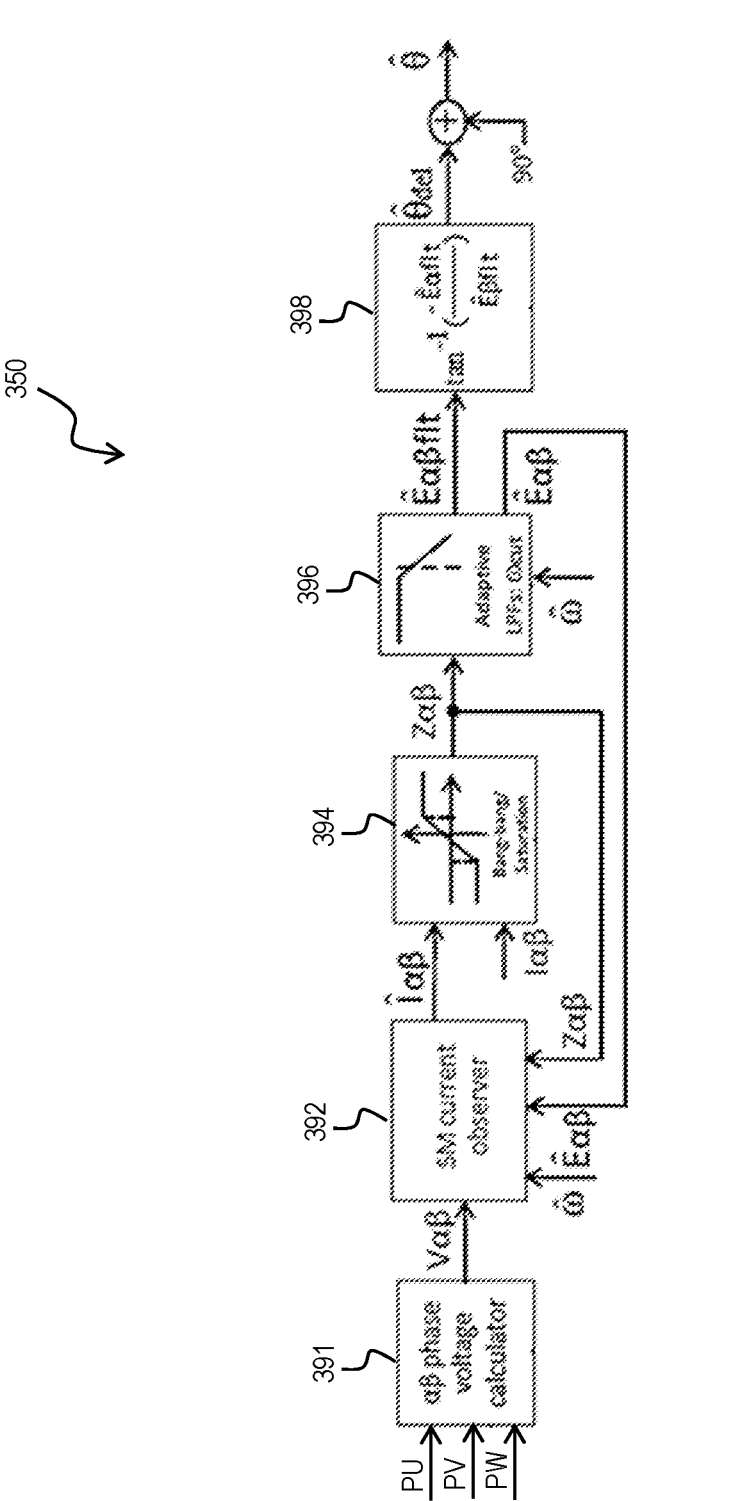
FIG. 27 depicts a block system diagram of SMO-based position estimator of FIG. 26, according to an embodiment.

FIGS. 26 and 27 depict a partial block system diagram of the power tool 10 using an alternative SMO execution technique, and block system diagram detailing the alternative SMO-based position estimator 350 respectively, according to an embodiment. As shown in these figures, in this embodiment, SMO-based position estimator 250 does not calculate the motor phase voltages based on DC bus voltage Vdc and drive signals Da, Db, and Dc. Rather, SMO-based position estimator 250 receives the motor phase voltage signals PU, PV, and PW directly from the motor 16. SMO-based position estimator 350 includes an αβ phase voltage calculator 391 that receives the phase voltage signals PU, PV, and PW and constructs 2-axis sinusoidal motor voltage waveforms Vα and Vβ (here represented as Vαβ) accordingly. The rest of the SMO process is similar to FIGS. 24 and 25 described above.

In an embodiment, the SMO equation described above is represented as follows:

$$\frac{di_{\alpha-\beta}}{dt} = -\frac{R_s}{L_{d-q}} \mp \omega_e * \frac{(L_d - L_q)}{L_d} * i_{\alpha-\beta} + \frac{1}{L_d}(u_{\alpha-\beta} - e_{\alpha-\beta})$$

where $u_{\alpha-\beta}$ corresponds to the motor phase voltages, $i_{\alpha-\beta}$ represents the measured motor phase current, $R_s$ is the per-phase stator resistance, $L_d$ is the direct axis stator per-phase inductance, $L_q$ is the quadrature axis stator per-phase inductance, and $e_{\alpha-\beta}=\mp E_{ext}$ (sin $\theta_e$/cos $\theta_e$) and corresponds to the extended back-EMF of the motor. The SMO-based Position Estimator 350 estimates $e_{\alpha-\beta}$ for a given $i_{\alpha-\beta}$ and $u_{\alpha-\beta}$ and calculates the position of the rotor as a function of $\tan^{-1} (e_\alpha/e_\beta)$.

In an embodiment, controller 230 executes SMO for high-speed operations up to the maximum tool speed. In an embodiment, controller 230 may implement hysteresis threshold value above or below the HFI threshold for transitioning back to HFI when the motor speed falls.

In an embodiment, controller 230 used for FOC execution and rotor position detection is a 32-bit processor employing ARM Cortex-M0+ processor core. A Cortex-M0+ processor core includes a two-stage pipeline architecture and is therefore cheaper and consumes less power than other ARM Cortex-M processors. Based on conventional wisdom, Cortex-M0+ processors are considered too slow to handle the processing power requires for FOC execution and rotor position detection, particularly in high-speed and/or high-torque motor control applications where the rotor angle can change very quickly in an unexpected manner. However, in an embodiment, by removing the Hardware Abstraction Layer (HAL) of the processor core, which provides a programming interface that allows the processor to interact with hardware resources, and customizing the related registers accordingly, Cortex-M0+ processors can be used to implement the techniques described above for power tool applications. Efficient rotor detection schemes described above have proven to be capable of execution by Cortex-M0+ processors. In particular, parking and open-loop frequency command start-up (steps B and C) prior to HFI, as well as the transition step from HFI to SMO (step E), provide for more accurate and efficient detection of rotor position without requiring significant processing power conventionally required. It should be noted, however, that more powerful processors, e.g. Cortex-M1, Cortex-M2, etc. may be alternatively utilized.

Spinning Restart

In a power tool, the tool is turned ON and OFF via a power switch. Power switch may be a current-carrying ON/OFF switch actuatable by a user, or a contact switch coupled to a trigger switch, a speed dial, or an actuator. Power switch may be coupled to a contact switch disposed on the current path of the power supply to cut off supply of power to the motor. Alternatively, power switch may be coupled electronically to a semiconductor switch disposed on the current path of the power supply. Power switch may also be coupled to a micro-electronic switch that sends a signal to the controller 230 to cut off supply of power to the motor.

When the power switch is turned OFF, the motor is allowed to coast down gradually to a halt by cutting off supply of power to the motor. Alternatively, a brake is applied to the motor to bring it rapidly to a halt. A brake may be either mechanical, e.g., brake pads applied to the motor shaft, or electronic, e.g. activating the high-side or the low-side power switches simultaneously to short the phases of the motor, thus using the motor's own voltage to bring it to a halt. Reference is made to US Patent Publication No. 2017/0234484, which is incorporated herein by reference in its entirety, for examples of electronic braking methods executed by the motor controller to brake a BLDC motor in a power tool.

In most power tools, when the power switch is turned back ON during braking or coasting of the motor, the motor controller completes the motor braking or allows the motor to finish coasting and come to a complete halt before it is restarted again. While this method is simple to execute, it is not desirable in many power tool applications where the tool user may turn the power switch ON and OFF frequently and in succession, for example, by depressing and repressing the power tool trigger switch. Doing so introduces unnecessary and undesirable delays in the power tool usage and is frustrating to the user. What is desirable is to provide a control mechanism whereby, when the power switch is turned ON during motor coasting or braking, the motor controller detects the present position and speed of the rotor and resumes motor commutation at the detected position and speed. This process is referred to as "spinning restart."

In a power tool having a BLDC motor and position sensors for detecting the rotor position, the motor controller is able to detect the position of a spinning rotor based on the position sensors and begin commutating the motor at the detected position and at the present motor speed for spinning restart. In sensorless control, particularly sensorless FOC control where motor current is measured to detect rotor position and speed, this process faces complications.

Figure 28:
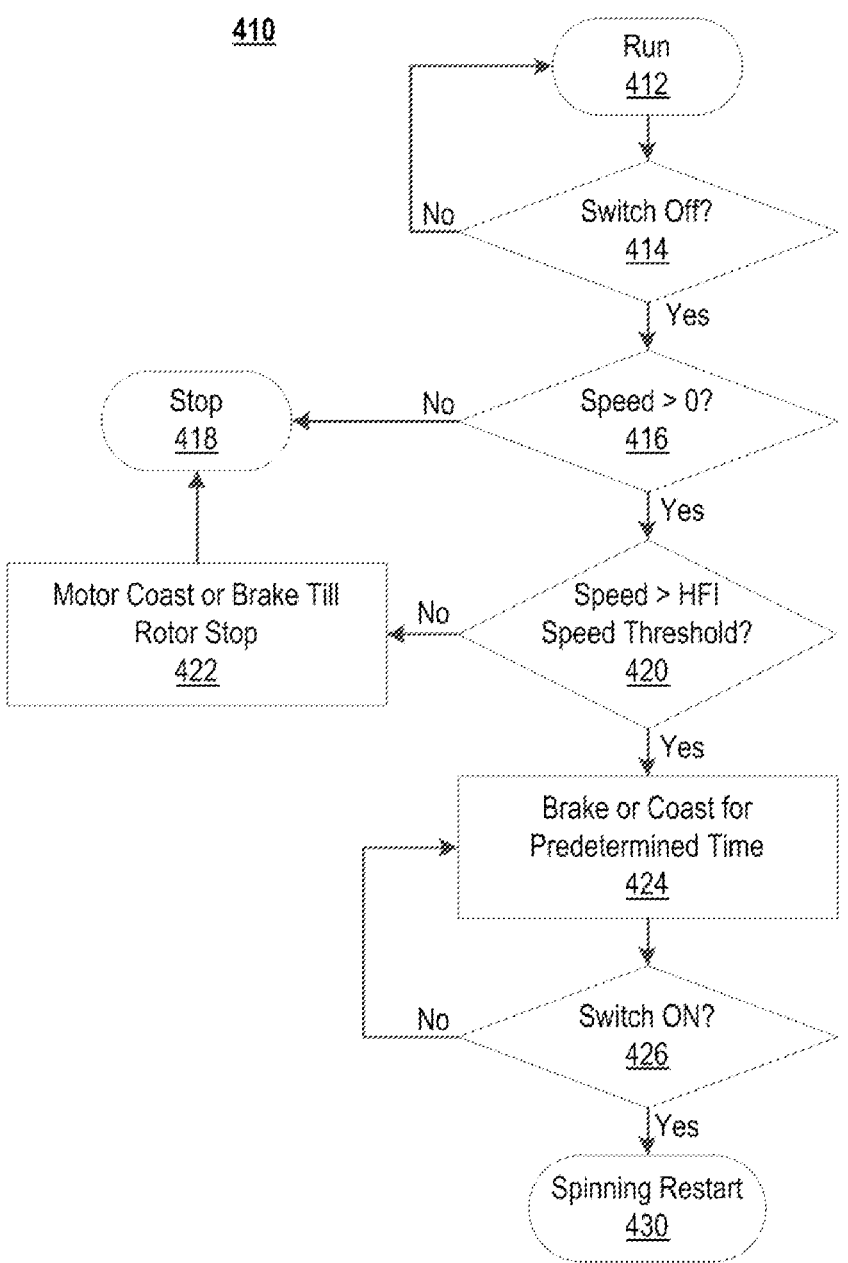
FIGS. 28 and 29 depict a process for spinning restart of a motor controlled by the SFOC process, according to an embodiment.
Figure 29:
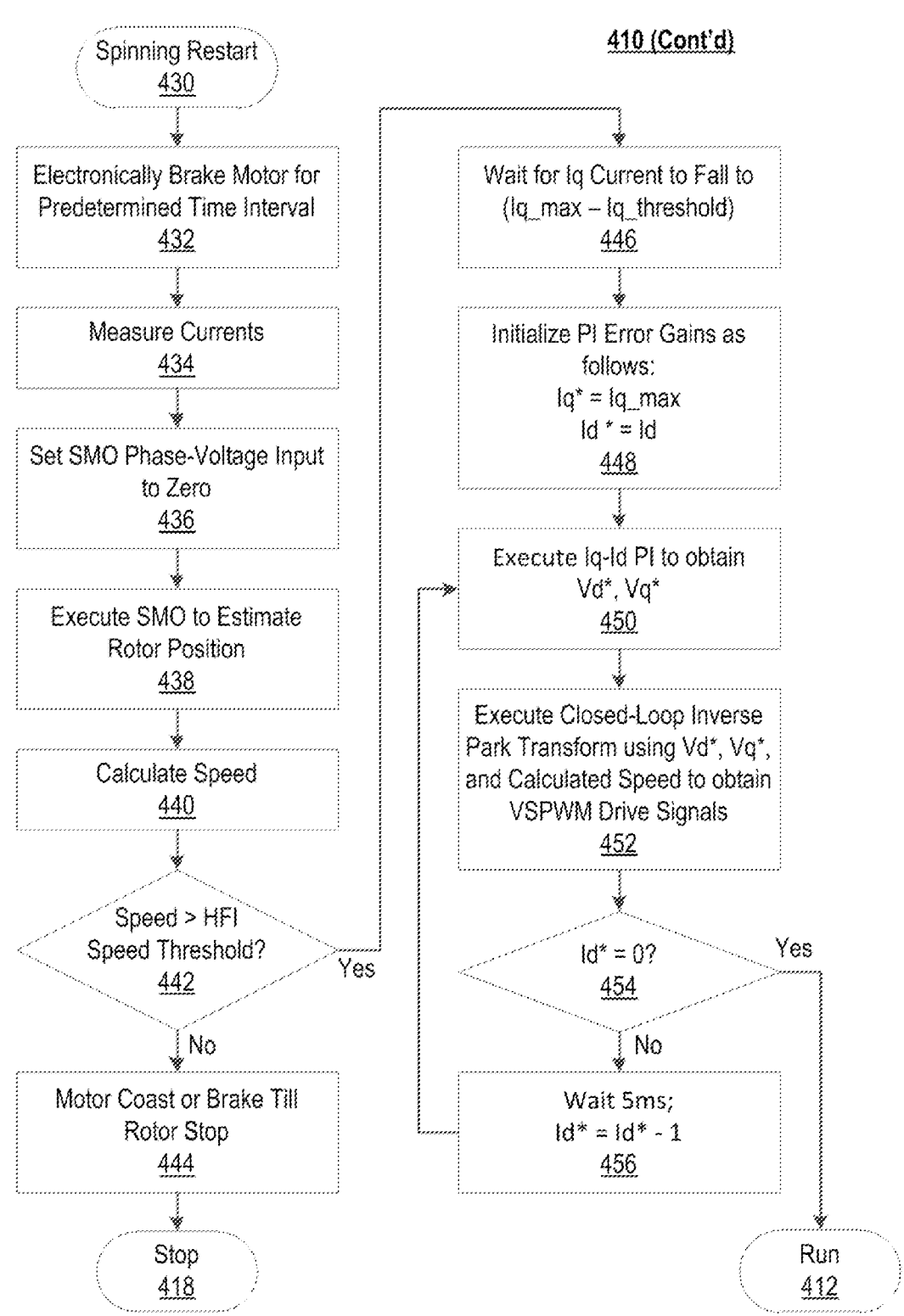

FIGS. 28 and 29 depict a process 410 for spinning restart of a motor 16 controlled by the SFOC process, according to an embodiment.

Referring to FIG. 28, in an embodiment, process 410 starts at 'run' step 412. In this step, controller 230 controls motor commutation using SFOC as disclosed with reference to steps A-F described above.

In an embodiment, controller 230 determines whether the power switch has been turned OFF in step 414. In an embodiment, controller 230 continues to 'run' the motor at step 412 as long the power switch has not been turned OFF.

In an embodiment, if the power switch has been turned OFF, controller 230 determines whether the motor output speed is greater than zero in step 416. As previously discussed, the rotor speed may be determined via speed estimator 334 using outputs of the HFI-based position estimator 342 in HFI (step D) or the SMO-based position estimator 350 in SMO (step F). In IPD (step A) or parking (step B), the rotor speed is zero. If controller 230 determines that the rotor speed is zero, it stops process 400 at step 418.

In an embodiment, if controller 230 determines that the rotor speed is greater than zero, it proceeds to determine whether the rotor speed is greater than the HFI speed threshold in step 420. Since HFI requires injection of high-frequency voltages to the drive voltage to estimate the rotor position, its execution during spinning restart encounters many challenges. Also, in an embodiment, spinning restart is significantly important when the rotor is operating at low speed. Thus, in an embodiment, if controller 230 determines that the rotor speed is at or below the HFI speed threshold, it does not even monitor the status of the power switch for spinning restart. Rather, controller 230 proceeds to brake the motor or allow it to coast down until the rotor comes to a complete stop at step 422. Thereafter, controller stops the process 410 at step 418. A user may turn the power switch ON to restart the motor after the rotor has come to a complete stop.

In an embodiment, if controller 230 determines that the rotor speed is above the HFI speed threshold, it brakes the motor or allows the motor to coast at step 424, while intermittently checking the status of the power switch at step 426. As long as the power switch remains OFF, controller continues to brake the motor or allow it to coast in step 424. If the power switch has been turned ON during braking or coasting, controller 230 goes into 'spinning restart' mode to step 430.

Referring to FIG. 29, in an embodiment, beginning at step 430, controller 230 electronically brakes the motor for a predetermined period at step 432. The electronic brake is applied by simultaneously activating the three low-side FETs, allowing controller 230 to obtain current measurements Ia and Ib via the shunts RU and RV at step 434. Without this electronic braking period (i.e., while motor is coasting), the high-side and low-side power switches of power switch circuit 226 are left open, current measurements Ia and Ib are zero, and controller 230 is unable to rely on SMO for rotor position estimation. This electronic braking period allows controller 230 to obtain the needed current measurements from the motor. In an embodiment, the predetermined time interval should be sufficiently long for controller 230 to measure motor currents. In an example, the predetermined time interval is between 10-40 ms, preferably approximately 20-30 ms.

As previously described, in addition to current measurement signals $I\alpha$ and $I\beta$ (i.e., Ia and Ib after Clarke transformation), SMO-based position estimator 350 relies on phase voltage signals (i.e., drive signals Da, Db, and Dc in FIG. 24 and $u_{\alpha-\beta}$ in the SMO estimation equation) to calculate the rotor position. In an embodiment, since the motor is not being actively driven, controller 230 sets the input phase voltage signals provided to the SMO-based position estimator 350 to zero at step 436. SMO-based position estimator 350 thus calculates the motor back-EMF in direct proportion to current signals $I\alpha$ and $I\beta$ to estimate the rotor position (i.e. rotor angle $\theta$) while electronic braking is applied, at step 438. Speed estimator 334 calculates the rotor speed w using the estimated rotor angle $\theta$ in step 440.

In an embodiment, controller 230 once again compares the calculated rotor speed w to the HFI speed threshold in step 442. If the calculated rotor speed w is at or lower than the HFI speed threshold, controller 230 applies a brake to the motor or allows it to coast down until the rotor comes to a complete stop at step 444. Thereafter, controller 230 proceeds back to step 418 to stops the process 410. However, if the calculated rotor speed w is greater than the HFI speed threshold, controller 230 executes SMO in steps 446-456 for spinning restart of the motor.

In an embodiment, to execute SMO, controller 230 initially waits for the Iq current (from Park transformation) to fall below a maximum Iq value at step 446. This is done because, in braking at high motor speed, the motor current components Id and Iq values rise rapidly, and the motor preferably should not be restarted as long as high currents circulate through the motor windings. Doing so would cause the motor current to flow back into the DC bus. In an embodiment, controller 230 waits until the Iq current component falls below the maximum Iq value (Iq_max) by a threshold value (Iq_threshold). In an example, Iq_max is approximately 25 A and Iq_threshold is approximately 5 A.

In an embodiment, after Iq current falls to Iq_max–Iq_threshold, controller 230 initializes PI loop controller 324 error gains Id* and Iq* for SMO execution in step 448. In an embodiment, Iq* is set to Iq_max and Id* is set to the measured Id current.

In an embodiment, PI loop is executed on Id and Iq to obtain Vd* and Vq* drive voltage signals at step 450. Inverse Park unit 326, inverse Clarke unit 328, and SVPWM unit 330 calculates drive signals Da, Db, and Dc according to the error gains signals Id* and Iq* for driving the motor at step 452. This process allows controller 230 to start motor commutation at the detected rotor angle θ and rotor speed ω.

It is noted that, in an embodiment, steps 434-452 above are executed while electronic braking is being applied to the motor beginning at step 432.

In an embodiment, since Id current does not generate torque to the motor, it is desirable to gradually ramp down the Id current from its detected value to zero. It was found that setting the Id* to 0 from the offset would cause the motor back-EMF to spike, often causing flow of current from the motor back to the DC bus. To avoid this, in an embodiment, in steps 454 and 456, controller 230 initially sets Id* to the measured Id and incrementally decreases Id* (in this example at 5 ms intervals) until Id* has reached zero. Controller 230 continues to execute steps 450 and 452 in the meantime. Once Id* has reached zero, controller 230 returns to the 'run' step 412, wherein controller 230 executed SMO normally as previously described to control motor commutation.

Figure 30:
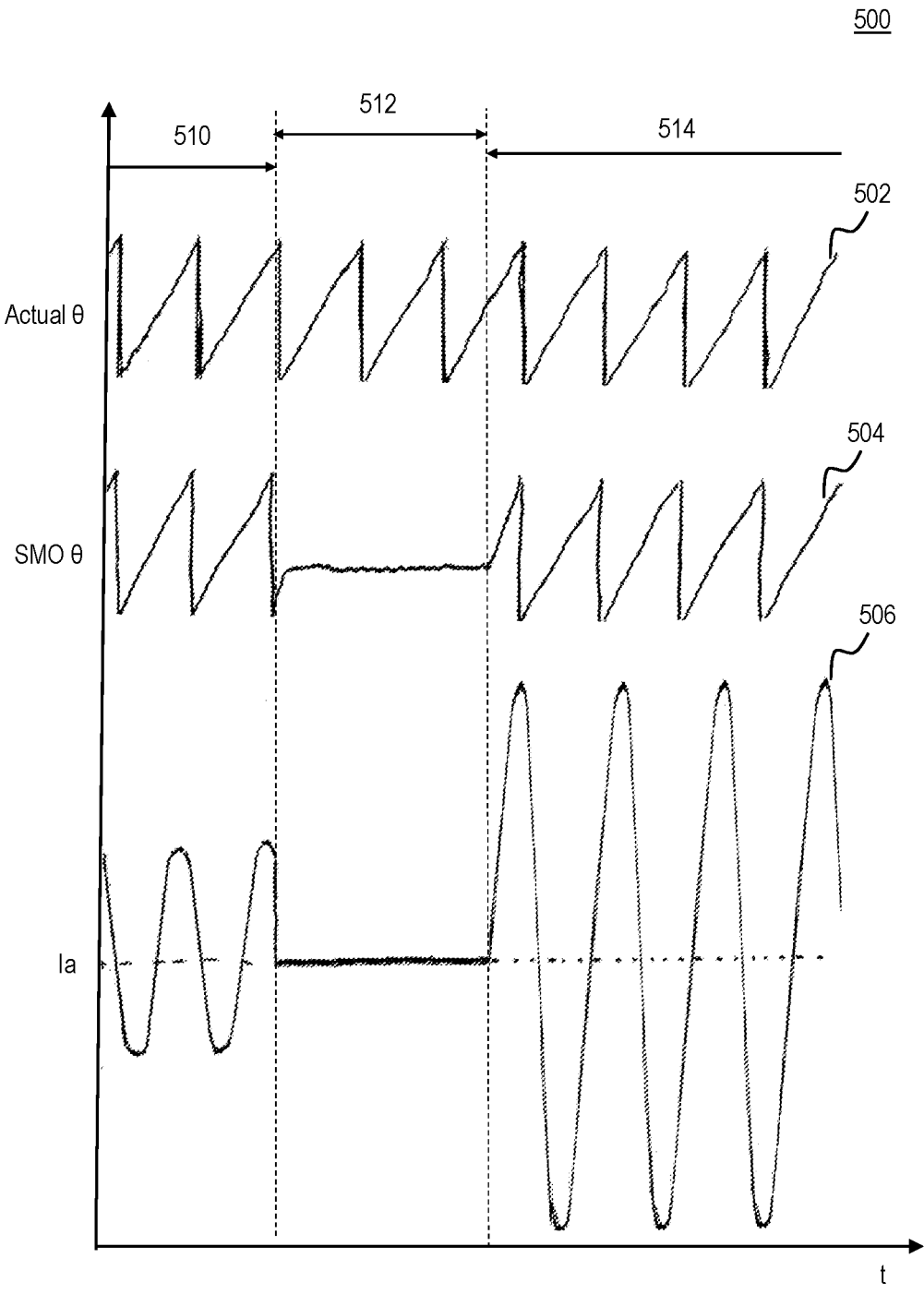
FIG. 30 depicts a waveform diagram of the actual rotor angle in comparison to the SMO-estimated rotor angle and the motor current, according to an embodiment.

Referring to FIG. 30, time graph 500 depicts a rotor angle waveform 502, which represents the actual angular position of the rotor measured in simulation using Hall sensors or similar electro-mechanical sensors; SMO-estimated rotor angle waveform 504, which represents the rotor angle θ calculated by the SMO-based position estimator 350; and motor current waveform 506, which represents one of the motor phase angle current signals Ia. This graph includes a motor drive period 510, in which the motor is being driven using FOC commutation technique of this disclosure during drive period 510; a motor coasting period 512, during which the motor is allowed to coast (i.e., upon power tool switch being turned off) by deactivating the power switch circuit 226; a braking period 514, in which electronic braking is applied to the motor by activating the three low-side switches in unison. In an embodiment, braking period 514 corresponds to step 432 of process 400 described above. As seen here, SMO is unable to detect the rotor angle during the coasting period 512. However, once electronic brake is applied, SMO is able to accurately detect the motor back-EMF and thus estimates the rotor angle during the braking period 514.

According to an alternative embodiment, if spinning restart takes place while the rotor is coasting, controller 230 may measure the motor back-EMF directly using the motor phase signals PU, PV and PW. In a coasting motor, since all the switches of the power switch circuit 226 are OFF, the phase signals PU, PV and PW only carry the motor back-EMF. In an embodiment, controller 230 may detect the rotor position and speed based on the motor back-EMF on signals PU, PV and PW.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:
1. A power tool comprising:
a housing;
a brushless motor disposed within the housing, the motor comprising a stator having a plurality of windings and a rotor;

a power switch circuit that supplies power from a power source to the brushless motor; and a controller configured to apply a drive signal to the power switch circuit to control the supply of power to the brushless motor, wherein the controller is configured to determine an angular position of the rotor using a high-frequency injection (HFI) scheme at a motor speed below a speed threshold and transition from the HFI scheme to a sensorless commutation scheme different from the HFI scheme during a transition period when the motor speed exceeds the speed threshold, wherein the HFI scheme includes injecting a plurality of voltage pulses to the motor and detecting corresponding high-frequency current components to determine the angular position of the rotor, and wherein, during the transition period, the controller is configured to:

calculate an error value between a detected rotor angle from the sensorless commutation scheme and the determined angular position of the HFI scheme;

gradually adjust a commutation sequence associated with the sensorless commutation scheme by ramping the commutation sequence up or down to reduce the error value;

determine that the error value has fallen below a predefined convergence threshold such that the detected rotor angle from the sensorless commutation scheme is substantially close to the determined angular position of the rotor from the HFI scheme; and in response to determining that the error value has fallen below the predefined convergence threshold, gradually ramp down injection of the plurality of voltage pulses associated with the HFI scheme.

2. The power tool of claim 1, wherein the controller is configured to apply a vector-space pulse-width modulation (VSPWM) control to the drive signal for field-orientated control of the brushless motor.

3. The power tool of claim 2, wherein the controller is configured to compute a position difference between the detected angular position of the rotor and a target position associated with a target speed reference, generate an error-correction signal as a function of the computed position difference, and apply the VSPWM control accordingly.

4. The power tool of claim 1, wherein the power switch circuit comprises a plurality of low-side switches, a plurality of high-side switches, and a shunt component to which at least one signal associated with a phase current of the motor is coupled.

5. The power tool of claim 4, wherein the shunt component is provided on an output node of the power switch circuit.

6. The power tool of claim 4, wherein the shunt component is provided in series with one of the low-side switches.

7. The power tool of claim 1, wherein the power switch circuit comprises a plurality of low-side switches and a plurality of high-side switches, wherein at least one signal associated with a phase current of the motor is coupled to a plurality of low-side switches and the controller measures the motor phase current using an internal resistance of the plurality of low-side switches.

8. The power tool of claim 7, wherein the controller is configured to determine an ON-state of the plurality of low-side switches and measure a shunt voltage of one of the low-side switches that in the ON-state to calculate the motor phase current.

9. The power tool of claim 1, wherein the controller is configured to operate the motor using the HFI scheme and the sensorless commutation scheme in a variable speed range of zero to at least 15,000 rotations-per-minute (RPM) and within a power output range of zero to at least 1500 watts.

10. The power tool of claim 1, wherein the sensorless commutation scheme includes a sliding-mode observer (SMO) step of estimating a back electromotive force (back-EMF) voltage of the motor based on a phase current of the motor and determining the angular position of the rotor based on the estimated back-EMF voltage.

11. The power tool of claim 1, wherein the controller is configured to operate the motor using the HFI scheme and the sensorless commutation scheme in a variable torque range of zero to at least 15 Newton-meters (N.m.) and within a power output range of zero to at least 1500 watts.

12. A method of operating a brushless motor including a stator having a plurality of windings and a rotor via a controller, comprising:

applying a drive signal to a power switch circuit to control a supply of power to the brushless motor;

determining an angular position of the rotor using a high-frequency injection (HFI) scheme at a motor speed below a speed threshold, wherein the HFI scheme includes injecting a plurality of voltage pulses to the motor and detecting corresponding high-frequency current components to determine the angular position of the rotor; and transitioning from the HFI scheme to a sensorless commutation scheme different from the HFI scheme during a transition period when the motor speed exceeds the speed threshold, wherein the transition includes:

calculating an error value between an angular position of the rotor from the sensorless commutation scheme and the determined angular position of the rotor from the HFI scheme;

gradually adjusting a commutation sequence associated with the sensorless commutation scheme by ramping the commutation sequence up or down to reduce the error value;

determining that the error value has fallen below a predefined convergence threshold such that the angular position of the rotor from the sensorless commutation scheme is substantially close to the determined angular position of the rotor from the HFI scheme; and in response to determining that the error value has fallen below the predefined convergence threshold, gradually ramping down injection of the plurality of voltage pulses associated with the HFI scheme.

* * * * *